United States Patent
Ota et al.

(10) Patent No.: US 9,769,879 B2
(45) Date of Patent: Sep. 19, 2017

(54) RADIATION HEATER APPARATUS

(71) Applicant: DENSO CORPORATION, Kariya, Aichi-pref. (JP)

(72) Inventors: Koji Ota, Kariya (JP); Manabu Maeda, Nagoya (JP); Yasuhiro Sagou, Chiryu (JP); Kouji Kondoh, Toyohashi (JP); Gentaro Masuda, Obu (JP); Hidetada Kajino, Nagoya (JP); Yoshihiko Shiraishi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 326 days.

(21) Appl. No.: 14/402,664

(22) PCT Filed: May 21, 2013

(86) PCT No.: PCT/JP2013/003215
§ 371 (c)(1),
(2) Date: Nov. 20, 2014

(87) PCT Pub. No.: WO2013/175764
PCT Pub. Date: Nov. 28, 2013

(65) Prior Publication Data
US 2015/0110477 A1   Apr. 23, 2015

(30) Foreign Application Priority Data

May 23, 2012 (JP) .................................. 2012-117899
Oct. 17, 2012 (JP) .................................. 2012-230103
Oct. 17, 2012 (JP) .................................. 2012-230105

(51) Int. Cl.
*F24D 19/02* (2006.01)
*F24H 9/00* (2006.01)
(Continued)

(52) U.S. Cl.
CPC ......... *H05B 3/0042* (2013.01); *B60H 1/2215* (2013.01); *H05B 3/06* (2013.01);
(Continued)

(58) Field of Classification Search
None
See application file for complete search history.

(56) References Cited

U.S. PATENT DOCUMENTS

| 5,200,154 A * | 4/1993 | Harada | F01N 3/2026 219/541 |
|---|---|---|---|
| 6,314,216 B1 | 11/2001 | Schulte et al. | |
| 2002/0015550 A1 | 2/2002 | Schulte et al. | |
| 2010/0065543 A1 * | 3/2010 | Dubey | H05B 3/34 219/213 |
| 2012/0061365 A1 * | 3/2012 | Okamoto | B60H 1/2225 219/202 |

(Continued)

FOREIGN PATENT DOCUMENTS

| CN | 101784137 A | 7/2010 |
|---|---|---|
| CN | 201830477 U | 5/2011 |

(Continued)

OTHER PUBLICATIONS

Office Action dated Jul. 3, 2015, issued in the corresponding CN application No. 201380026455.4 with English translation.
(Continued)

*Primary Examiner* — Thor Campbell
(74) *Attorney, Agent, or Firm* — Harness, Dickey & Pierce, P.L.C.

(57) ABSTRACT

A radiation heater apparatus has a plurality of heat radiation parts and a plurality of heating parts. A low thermal conductive part is formed between adjacent two of the heat radiation parts. The low thermal conductive part is provided with resin material which mainly forms a substrate part. The low thermal conductive part thermally isolates the heat radiation part by surrounding a periphery of the heat radiation part. As a body contacts with the surface of the apparatus, the thermal energy of specific heat radiation part directly under the body dissipates heat to the body. Furthermore, heat transfer from the periphery of the specific heat radiation part to the specific heat radiation part is reduced by the low thermal conductive part.

22 Claims, 22 Drawing Sheets

(51) Int. Cl.
  *H05B 3/20* (2006.01)
  *H05B 3/00* (2006.01)
  *H05B 3/06* (2006.01)
  *H05B 3/26* (2006.01)
  *B60H 1/22* (2006.01)

(52) U.S. Cl.
  CPC .............. *H05B 3/26* (2013.01); *H05B 3/267* (2013.01); *H05B 2203/002* (2013.01); *H05B 2203/003* (2013.01); *H05B 2203/005* (2013.01); *H05B 2203/007* (2013.01); *H05B 2203/013* (2013.01); *H05B 2203/014* (2013.01); *H05B 2203/032* (2013.01)

(56) References Cited

U.S. PATENT DOCUMENTS

2012/0267354 A1* 10/2012 Okamoto ................ F24D 13/02
                                                              219/202

FOREIGN PATENT DOCUMENTS

| JP | S6410033 A | 1/1989 |
| JP | 2012056531 A | 3/2012 |
| JP | 2012228896 A | 11/2012 |

OTHER PUBLICATIONS

Surveillance Study Report 2008 (in Japanese with partial English Translation).

International Search Report and Written Opinion (in Japanese with English Translation) for PCT/JP2013/003215, mailed Jul. 2, 2013; ISA/JP.

Office Action mailed Oct. 20, 2015 in the corresponding JP Application No. 2012-230105 with English translastion.

* cited by examiner

RADIATION HEATER APPARATUS

CROSS REFERENCE TO RELATED APPLICATIONS

This application is a U.S. National Phase Application under 35 U.S.C. 371 of International Application No. PCT/JP2013/003215 filed on May 21, 2013 and published in Japanese as WO 2013/175764 A1 on Nov. 28, 2013. This application is based on and claims the benefit of priority from Japanese Patent Applications No. 2012-117899 filed on May 23, 2012, No. 2012-230103 filed on Oct. 17, 2012, and No. 2012-230105 filed on Oct. 17, 2012. The entire disclosures of all of the above applications are incorporated herein by reference.

BACKGROUND

Technical Field

The present disclosure relates to a radiation heater apparatus which warms an object by heat radiation.

Background Art

Patent Literature 1 discloses one of a radiation heater apparatus. The apparatus is disposed in a vehicle compartment to face a passenger.

Patent Literature 1 JP2012-56531A

SUMMARY

This apparatus is effective as an apparatus which gives passenger a warm feeling, in order to assist a heating apparatus for vehicle. However, the radiation heater apparatus still needs further improvements.

It is an object of the present disclosure to provide a radiation heater apparatus which can reduce a temperature of a part which contacts with an object body.

It is another object of the present disclosure to provide a radiation heater apparatus which can avoid that the temperature of the part in contact with an object body is maintained at a high temperature over a long period of time.

The present disclosure employs the following technical means, in order to attain the above-mentioned object.

One of the disclosures has a plurality of heat radiation parts which is capable of emitting heat radiation by thermal energy generated by being supplied with electric current. The heat radiation parts are arranged on a surface in a distributed manner. The disclosure has a low thermal conductive part which has a thermal conductivity lower than a thermal conductivity in a cross section containing the heat radiation part, and is disposed to surround each of the plurality of heat radiation parts.

According to this structure, a plurality of heat radiation parts is arranged in a distributed manner. Each of the plurality of heat radiation parts is surrounded by the low thermal conductive part. The low thermal conductive part has the thermal conductivity lower than the thermal conductivity in the cross section containing the heat radiation parts. Therefore, heat transfer from the perimeter of one or a group of the heat radiation parts to that one or the group of the heat radiation parts can be reduced. As a body contacts with a surface of the radiation heater apparatus, the heat radiation parts at a portion where the body contacts rapidly dissipates heat, and a temperature of the portion where the body contacts falls. Furthermore, incoming flow of the thermal energy from the perimeter is reduced by the low thermal conductive part. As a result, it is possible to reduce temperature of the portion where the body contacts.

One of the disclosures has a plurality of heat radiation parts which is capable of emitting heat radiation by thermal energy generated by being supplied with electric current. The heat radiation parts are arranged on a surface in a distributed manner. The disclosure has a low thermal conductive part which has a thermal conductivity lower than a thermal conductivity in a cross section containing the heat radiation part, and is disposed to surround each of the plurality of heat radiation parts. The disclosure has a heating part which is thermally connected to the heat radiation part and generates heat by being supplied with electric current. In the disclosure, at least a part of the heating part is arranged within a thin layer defined by a thickness of the plurality of heat radiation parts.

According to this structure, the heating parts are arranged in the thin layer which is defined by the thickness of the plurality of heat radiation parts. Therefore, even if it adopts both the heat radiation parts and the heating parts, it is possible to provide a thin radiation heater apparatus.

DESCRIPTION OF EMBODIMENTS

Figure 1:
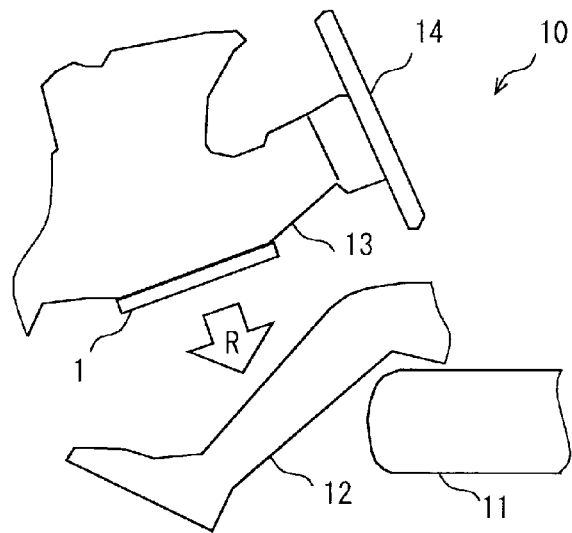
FIG. 1 is a block diagram showing a radiation heater apparatus according to a first embodiment of the present disclosure.

Referring to the drawings, embodiments of the present disclosure are described hereinafter. In the embodiments, the parts corresponding to the matter described in the previous embodiment are indicated with the same reference numbers and the same descriptions will not be reiterated. In a case that only a part of component is described, the other embodiments previously described may be applied to the other parts of components. In a consecutive embodiment, a correspondence is shown by using a similar reference symbol in which only hundred and more digits differ to indicate a part corresponding to a matter described in the previous embodiment, and the same description may not be repeated. It is possible to combine the embodiments in some forms which are clearly specified in the following description, and also, unless trouble arises, in some forms which are not clearly specified.

First Embodiment

In FIG. 1, the radiation heater apparatus 1 according to a first embodiment is mounted on an interior of a room of movable bodies, such as a road vehicle, a marine vessel, and an aircraft. The apparatus 1 provides a part of a heating apparatus 10 for the interior of the room. The apparatus 1 is an electric heater which generates heat in response to electric power supply from a power source, such as a battery, a generator, etc. which are carried in the movable body. The apparatus 1 is formed in a shape of thin plate. The apparatus 1 generates heat by being supplied with electric power. The apparatus 1 emits a heat radiation R mainly towards a direction vertical to a surface thereof, in order to warm an object body positioned in the direction vertical to the surface.

In the room, a seat 11 for a passenger 12 to sit down is installed. The apparatus 1 is disposed in the room to emit the heat radiation R to feet of the passenger 12. The apparatus 1 can be used as an apparatus for providing warm feeling immediately to the passenger 12 at a stage immediately after starting of the heating apparatus 10. The apparatus 1 is disposed on a wall of the room. The apparatus 1 is disposed so that the apparatus 1 faces the passenger 12 in an assumed usual posture. For example, the road vehicle has a steering column 13 for supporting a handle 14. The apparatus 1 may be disposed on an underside of the steering column 13 to face the passenger 12.

Figure 2:
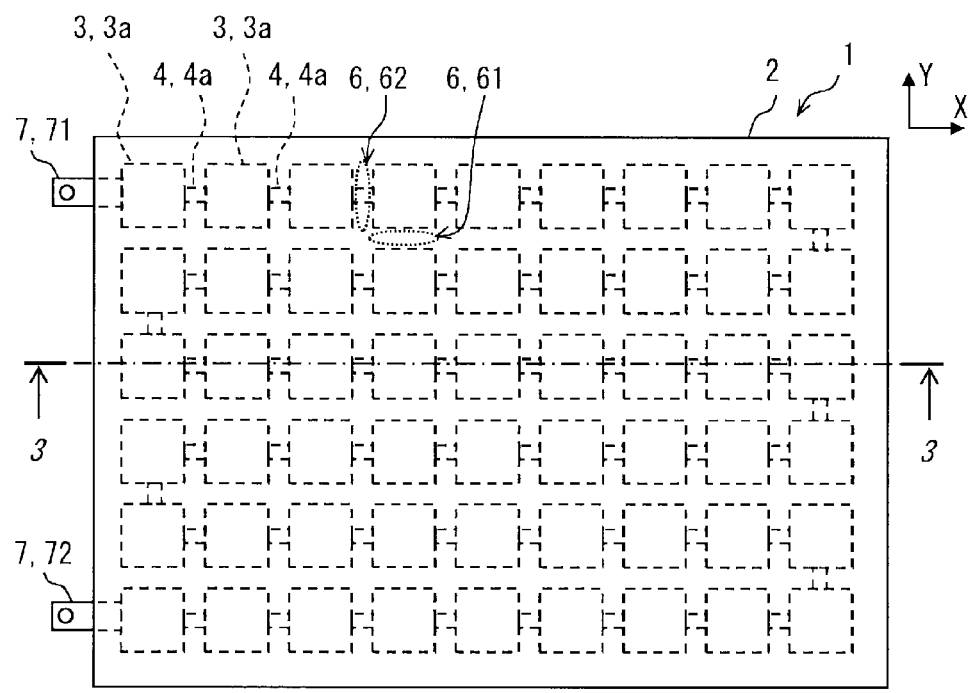
FIG. 2 is a plan view of the radiation heater apparatus according to the first embodiment.
Figure 3:
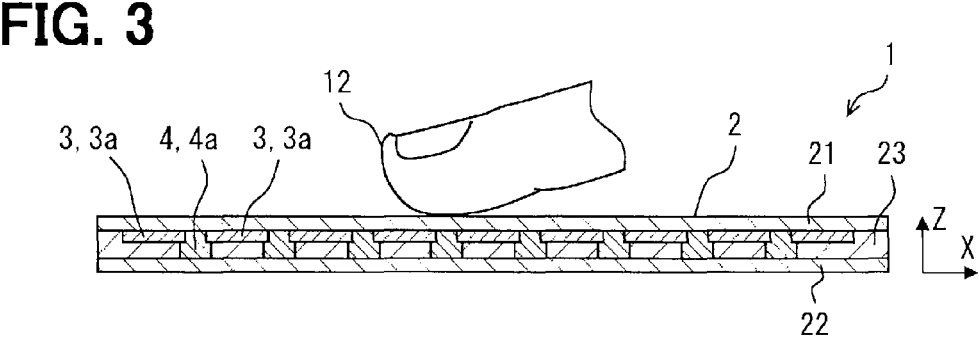
FIG. 3 is a cross sectional view of the radiation heater apparatus according to the first embodiment.

FIGS. 2 and 3 show the radiation heater apparatus 1. FIG. 3 shows a cross-section on a 3-3 line shown in FIG. 2. In the drawing, the apparatus 1 develops over an X-Y plan defined by an axis X and an axis Y. The apparatus 1 has a thickness in a direction of an axis Z. The apparatus 1 is formed in a shape of an almost square flat plate. The apparatus 1 has a substrate part 2, a plurality of heat radiation parts 3, a plurality of heating parts 4, and a pair of terminals 7. In the following description, a symbol with an alphabetic character is used to point a specific member of the embodiment out. For example, in a case of the heating part of the embodiment, 3a is used. The apparatus 1 may also be called a plate shaped heater which emits a heat radiation R mainly towards a direction vertical to the surface.

The substrate part 2 is made of a resin material which provides fine electrical insulation properties and withstands in elevated temperature. The substrate part 2 is a multilayer substrate. The substrate part 2 has a surface layer 21, a back layer 22, and a middle layer 23. The surface layer 21 faces toward a radiation direction of the heat radiation R. In other words, in a disposed condition of the apparatus 1, the surface layer 21 provides a surface which is disposed to counter a part of the passenger 12 who is an object body for heating. The back layer 22 provides a back surface of the apparatus 1. The middle layer 23 supports the heat radiation parts 3 and the heating parts 4. The substrate part 2 is a member for supporting a plurality of heat radiation parts 3.

Each of a plurality of heat radiation parts 3 is made by a material having high thermal conductivity. The heat radiation parts 3 are made of a fine electric conductor, i.e., a material having low electric resistance. The heat radiation parts 3 may be made of a metal material.

Each of a plurality of heat radiation parts 3 is formed in a shape of thin plate which is in parallel to the surface of the substrate part 2. One heat radiation parts 3 can emit the heat radiation R by thermal energy generated by electric current. One of the heat radiation parts 3 can emit the heat radiation R which may make the passenger 12, i.e., a person, to feel warmth, when heated to a predetermined radiation temperature. Volume of one of the heat radiation parts 3 is set so that the heat radiation part 3 can reach the temperature which can emit the heat radiation R with the thermal energy supplied from the heating parts 4. The volume of one of the heat radiation parts 3 is set so that the temperature of the heat radiation part 3 may rise quickly with the thermal energy supplied from the heating parts 4. The volume of one of the heat radiation parts 3 is set small so as to produce rapid temperature lowering by heat dissipation to the body which contacts on the surface of the apparatus 1. The thickness of one of the heat radiation parts 3 is set thin in order to maximize area parallel to the surface and to minimize the volume. The area of one of the heat radiation parts 3 is set to an area which is suitable to emit the heat radiation R. The area of one of the heat radiation parts 3 is set smaller than a part of the body, e.g., the passenger 12, positioned to face the surface of the apparatus 1.

One of the heat radiation parts 3a in this embodiment is formed in a square shape on the X-Y plan. Even electric current is supplied to the heat radiation part 3a, the heat radiation part 3a itself does not generate thermal energy which produces the heat radiation R to the extent that the passenger 12 is made to feel warmth. The heat radiation parts 3a are the members only for radiating heat, not for generating heat.

The plurality of heat radiation parts 3 are arranged on the surface of the substrate part 2 in a distributed manner. In other words, the plurality of heat radiation parts 3 are arranged on the plan from which the heat radiation R is emitted in a distributed manner. The plurality of heat radiation parts 3 are arranged so that it may not overlap each other. The plurality of heat radiation parts 3 are arranged to be spaced apart each other. The plurality of heat radiation parts 3 are regularly arranged to occupy a predetermined area on the X-Y plan in the drawing. The plurality of heat radiation parts 3 may be called an array of heat radiation parts. The plurality of heat radiation parts 3 are arranged to form a grid having n by n (n rows and n columns) on the surface of the substrate part 2. The plurality of heat radiation parts 3 are distributed on the surface of the substrate part 2 in accordance with a predetermined regulation. The plurality of heat radiation parts 3 are arranged on one or more current routes formed between a pair of terminals 7, i.e., between a terminal 71 and a terminals 72. In the example of the drawing, the plurality of heat radiation parts 3 is arranged on the current path which extends in a meandering shape manner.

The plurality of heat radiation parts 3 are embedded within the substrate part 2. Specifically, the plurality of heat radiation parts 3 are arranged between the surface layer 21 and the middle layer 23. Therefore, the plurality of heat radiation parts 3 are not exposed to the surface of the substrate part 2. The plurality of heat radiation parts 3 are protected by the substrate part 2.

Each of the plurality of heating parts 4 is made of a material which generates heat by being supplied with electric current. The heating parts 4 may be made of metal material. The plurality of heating parts 4 and the plurality of heat radiation parts 3 are arranged on the surface of the substrate part 2 in a distributed manner.

The heating parts 4 are arranged between adjacent two of the heat radiation parts 3 and 3, and are connected to adjacent two of the heat radiation parts 3 and 3. Therefore, the heating parts 4 are members which are thermally connected to the heat radiation parts 3, and generate heat by being supplied with electric current. The heating parts 4 and the heat radiation parts 3 are connected in a thermally conductive manner. Thereby, the thermal energy generated by the heating parts 4 is directly conveyed to the heat radiation parts 3 directly connected. The thermal energy generated by one of the heating parts 4 is also conveyed to the other heat radiation part 3 located remotely from one of the heating parts 4 via members, such as the substrate part 2. Furthermore, the heating parts 4 and the heat radiation parts 3 are connected in an electrically conductive manner. At least two heating parts 4 are connected to one of the heat radiation parts 3. The plurality of heating parts 4 and the plurality of heat radiation parts 3 form a series of current routes between a pair of terminals 7.

In order to concentrate current, the heating parts 4 are formed to have a small cross-sectional area along a flowing direction of electric current. In order to reduce heat transfer between adjacent two of the heat radiation parts 3, the heating part 4 is formed to reduce a cross-sectional area at a portion between adjacent two of the heat radiation parts 3. In the illustrated example, the heating part 4 is thicker than the heat radiation part 3. However, a width of the heating part 4 on the X-Y plan is smaller than a width of the heat radiation parts 3. The width of the heating part 4 on the X-Y plan is smaller than a half of the width of the heat radiation part 3. A length of the heating part 4 is set so that the heating part 4 has a predetermined length in order to obtain a predetermined heat generation. The length of the heating parts 4 is set long in order to reduce heat transfer between adjacent two of the heat radiation parts 3. As a result, the heating parts 4 are provided with a narrow and long shape on the X-Y plan.

One of the heating parts 4 in this embodiment is formed to fill a gap between adjacent two of the heat radiation parts 3 and 3, and to be placed under adjacent two of the heat radiation parts 3 and 3. The heating parts 4a also emit the heat radiation R. However, since an area of the heating parts 4a in the X-Y plan is small, there are small amount of the heat radiation R. The heating parts 4a are the members for both generating heat and radiating heat.

The heating parts 4a are arranged to be covered with the heat radiation parts 3a except for a part located between the heat radiation parts 3a. In other words, the heating part 4a and the heat radiation part 3a are arranged in an overlapping manner with respect to a direction vertical to a surface from which the heat radiation R is emitted, i.e., a radiation direction of the expected heat radiation R. The heating parts 4a are thermally connected with the heat radiation parts 3. In this structure, it is possible to provide a good thermal conductivity from the heating parts 4a to the heat radiation parts 3a.

In this embodiment, at least a part of the heating part is arranged within the thin layer which is defined by the thickness of the plurality of heat radiation parts 3a. Therefore, even if it is adopted both the heat radiation parts and the heating parts, it is possible to provide a thin radiation heater apparatus 1. One heating part 4a has a part arranged within the thin layer defined by the heat radiation parts 3a. At least a part of the heating part 4a is placed on the same plan where the plurality of heat radiation parts 3a are arranged. The plurality of heat radiation parts 3a and the plurality of heating parts 4a overlap with respect to a surface direction of the heat radiation parts 3a, i.e., a direction parallel to the X-Y plan. As least a part of the heating part 4a is arranged along with the heat radiation parts 3a with respect to the surface direction of the heat radiation parts 3a, i.e., the direction parallel to the X-Y plan. In other words, at least a part of the heating part 4a is placed within a thickness range of the heat radiation parts 3a. This structure makes it possible to transfer the thermal energy generated in the heating part 4a toward the surface direction.

At least a part of the heating part 4a is arranged to project toward back side direction from a thin layer which is defined by the thickness of the plurality of heat radiation parts 3a. One of the heating parts 4a has a part projecting in the back side direction from the thin layer defined by the heat radiation parts 3a. At least a part of the heating part 4a is placed to project from the same plan where the plurality of heat radiation parts 3a are arranged. The plurality of heat radiation parts 3a and the plurality of heating parts 4a have portions where those parts do not overlap each other with respect to a surface direction of the heat radiation parts 3a, i.e., a direction parallel to the X-Y plan. In other words, at least a part of the heating part 4a is placed outside a thickness range of the heat radiation parts 3a.

The number of the heat radiation parts 3 and the number of the heating parts 4 are almost equal. As a result, an amount of heat which is almost equal to an amount of heat generated by one of the heating parts 4 is given to one of the heat radiation parts 3. The thermal energy generated by one of the heating parts 4 and supplied to the heat radiation part 3 is set so that a temperature of corresponding one of the heat radiation parts 3 can reach the radiation temperature.

A low thermal conductive part 6 is formed between adjacent two of the heat radiation parts 3, for reducing heat transfer between them. The low thermal conductive part 6 is provided with material which mainly forms the substrate part 2. The low thermal conductive part 6 surrounds a periphery of one heat radiation part 3 on the X-Y plan. The low thermal conductive part 6 surrounding one heat radiation part 3 reduces inflow of the thermal energy from the periphery to the heat radiation part 3. All of the heat radiation parts 3 are surrounded at each periphery by the low thermal conductive part 6. The low thermal conductive part 6 provides thermal barriers among the plurality of heat radiation parts 3 by surrounding the peripheries of all of the heat radiation parts 3. The low thermal conductive part 6 thermally separates the plurality of heat radiation parts 3 each other.

The low thermal conductive part 6 surrounding one specific heat radiation part 3 reduces the heat transfer from the periphery of the specific heat radiation part 3 to the specific heat radiation part 3. Alternatively, it is possible to assume a specific heat radiation part group on the apparatus 1. The specific heat radiation part group is a group of a plurality of heat radiation parts 3 positioned as a one group. In this case, the low thermal conductive part 6 surrounding the specific heat radiation part group reduces the heat transfer from the periphery of the specific heat radiation part group to the specific heat radiation part group.

In this embodiment, since the heat radiation part 3a is a square shape, the low thermal conductive part 6 is arranged at those four sides respectively. A first low thermal conductive part 61 containing the substrate part only is formed on at least one side of the heat radiation part 3a. The first low thermal conductive part 61 is formed on at least two sides of one heat radiation part 3a. A second low thermal conductive part 62 containing the substrate part 2 and the heating part 4 is formed on at least one side of the heat radiation part 3a. The second low thermal conductive part 61 is formed on at least one side of one heat radiation part 3a. In the case of the heat radiation part 3a surrounded by the other heat radiation parts 3a on four sides, two of the first low thermal conductive part 61 and two of the second low thermal conductive part 62 surround the heat radiation part 3a.

Figure 4:
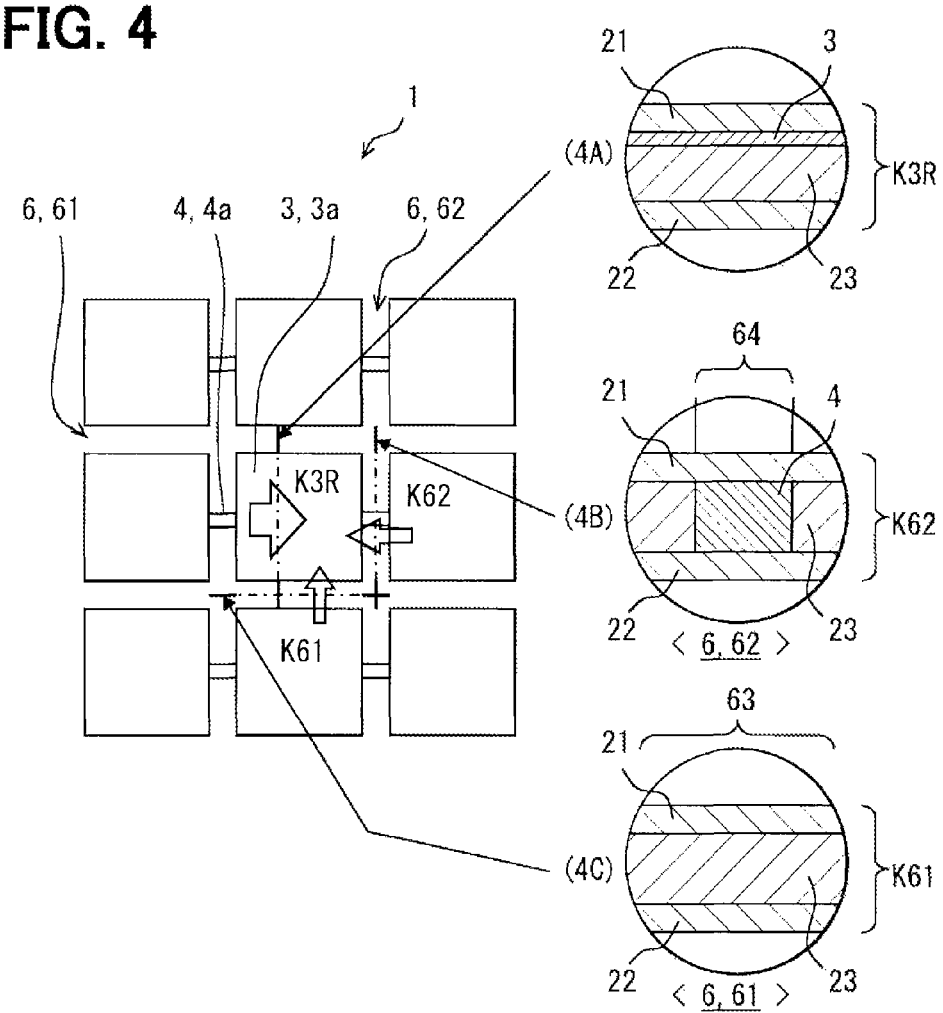
FIG. 4 is a descriptive diagram showing heat transfer routes in the radiation heater apparatus according to the first embodiment.

FIG. 4 shows a cross section (4A) containing one of the heat radiation parts 3 and cross sections (4B) and (4C) formed in the perimeter of the heat radiation part 3. A direction of main heat transfer is shown by an arrow in the drawing. The first low thermal conductive part 61 shown in the cross section (4C) is made of only materials 21, 22, and 23 which constitute the substrate part 2. Therefore, an average thermal conductivity K61 at the first low thermal conductive part 61 can be obtained based on the thermal conductivity of the substrate part 2. The second low thermal conductive part 62 shown in the cross section (4B) is made of materials 21, 22, and 23 which constitute the substrate part 2 and the heating part 4. Therefore, an average thermal conductivity K62 at the second low thermal conductive part 62 can be obtained based on the thermal conductivity of the substrate part 2 and the thermal conductivity of the heating part 4. An average thermal conductivity K3R at a cross section crossing the heat radiation part 3 shown in the cross section (4A) can be obtained based on the thermal conductivity of the substrate part 2 and the thermal conductivity of the heat radiation part 3.

The thermal conductivity K2 of the resin material which forms the substrate part 2 is markedly lower than the thermal conductivity K3 of the material which provides the heat radiation parts 3, and the thermal conductivity K4 of the material which provides the heating parts 4. That is, relationships are $K2 \ll K3$, and $K2 \ll K4$. The thermal conductivity K4 of the material which provides the heating parts 4 is lower than the thermal conductivity K3 of the material which provides the heat radiation part 3. That is, a relationship is $K4 < K3$. The thermal conductivity K62 is greater than the thermal conductivity K61. That is, a relationship is $K61 < K62$. However, the thermal conductivity K3R is markedly greater than the thermal conductivity K61 and the thermal conductivity K62. That is, relationships are $K61 \ll K3R$ and $K62 \ll K3R$.

The heat radiation part 3a surrounded four sides thereof is surrounded by two of the first low thermal conductive part 61 and two of the second low thermal conductive part 62. Therefore, an average thermal conductivity KP in the periphery surrounding the heat radiation part 3 is $KP = 2 \cdot K61 + 2 \cdot K62$. In this embodiment, the material and the sizes are set to be $KP < K3R$. That is, the average thermal conductivity K3R in the cross section (4A) which crosses the heat radiation part 3 is larger than the thermal conductivity KP of the periphery surrounding the heat radiation part 3.

According to this configuration, the thermal energy can be transferred rapidly at the cross section containing the heat radiation part 3. Therefore, the temperature of one heat radiation part 3 can be increased and decreased quickly. When a body does not contact on the surface of the apparatus 1, an amount of heat generation of the heating part 4 is set so that a predetermined radiation temperature is obtained at the surface of the surface layer 21 on the heat radiation part 3. Thereby, it is possible to emit the heat radiation R which can give the passenger 12 warmth. The amount of heat generation of the heating part 4 may be adjusted by material of the heating part 4, sizes, and a value of electric current. As an electric current supply to the apparatus 1 begins, the surface temperature of the apparatus 1 rapidly increases to the above-mentioned predetermined radiation temperature. Accordingly, also in winter etc., warmth can be promptly given to a passenger 12.

When a body contacts on the surface of the apparatus 1 at above one specific heat radiation part 3, the thermal energy of the specific heat radiation part 3 is quickly transferred to the body which contacts. As a result, the temperature of the specific heat radiation part 3 falls quickly. Therefore, the surface temperature of the apparatus 1 at a portion on which the body contacts falls quickly. The thermal energy of the specific heat radiation part 3 transferred to the contacting body, and is diffused in the contacting body. Accordingly, it is possible to reduce excessive increase of the surface temperature of the contacting body.

The heating parts 4 directly connected to the specific heat radiation part 3 generates heat and supply the thermal energy, but does not generate such a large amount of heat that can excessively increase the temperature of the portion where the body contacts. Thereby, it is possible to suppress increase of the surface temperature of the apparatus at the portion where the body contacts.

While the body contacts a portion of the surface of the apparatus 1, a balance of the thermal energy supplied by the heating parts 4 and the thermal energy radiated by the heat radiation part 3 is maintained at a portion where the body does not contact. Therefore, the surface temperature of the apparatus 1 at a portion where the body does not contact may become a high temperature which is suitable for emitting the heat radiation R.

According to the above-mentioned structure, heat transfer from a perimeter of one specific heat radiation part 3 to the specific heat radiation part 3 can be reduced. Accordingly, it is possible to reduce an amount of heat additionally supplied to the specific heat radiation part 3. The reduced amount of heat additionally supplied to the specific heat radiation part 3 is transferred to the contacting body and is diffused into the contacting body. As a result, it is possible to suppress increase of the surface temperature of the apparatus 1 at the portion where the body contacts. Simultaneously, it is possible to suppress excessive increase of the surface temperature of the contacting body. The thermal conductivity of the low thermal conductive part 6 is set, when a body contacts above the heat radiation part 3, so that a temperature of a portion, where the body contacts, is stable at a suppressed temperature lower than the radiation temperature and slightly higher than a temperature of the body.

According to this structure, the thermal capacity of one heat radiation part 3, or the thermal capacity of one group of the heat radiation parts 3 is small. Since heat transfer from a periphery to one of the heat radiation parts 3 or one group of the heat radiation parts is reduced by the low thermal conductive part 6, an additional thermal energy supply can be reduced. Accordingly, in a case that a body contacts on the surface of the apparatus 1 above one of the heat radiation part 3, or above a group of the heat radiation parts 3, it is possible to avoid that a temperature of the portion where the body contacts is maintained at a high temperature over a long time.

In another viewpoint, the low thermal conductive part 6 surrounding the specific heat radiation part 3 has a third low thermal conductive part 63 which contains only substrate part 2, and a fourth low thermal conductive part 64 containing the heating parts 4. In the drawing, a range excluding only the heating part 4 from the periphery of the heat radiation part 3 is the third low thermal conductive part 63. The fourth low thermal conductive part 64 is a portion where the heating part 4 exists with respect to the thickness direction. In this embodiment, the width of the heating part 4 is small enough compared with the width of the heat radiation part 3. Accordingly, the third low thermal conductive part 63 surrounds ¾ or more of the periphery of one heat radiation part 3 on the X-Y plan. It is desirable that the third low thermal conductive part 61 surrounds ⅘ or more of the periphery of one heat radiation part 3. The third low thermal conductive part 61 may surround 9/10 or more of the periphery of one heat radiation part 3. All of the heat radiation parts 3 are surrounded by the third low thermal conductive part 6 at almost all of each periphery. Accordingly, heat transfer to the heat radiation part 3 from a periphery thereof can be reduced.

Figure 5:
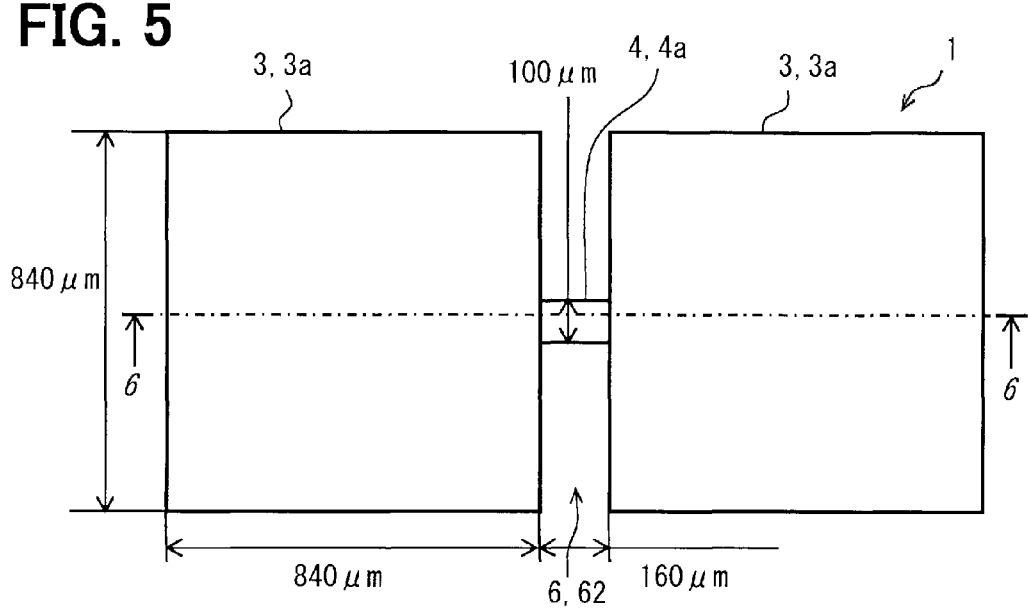
FIG. 5 is a partial enlarged cross sectional view of the radiation heater apparatus according to the first embodiment.
Figure 6:
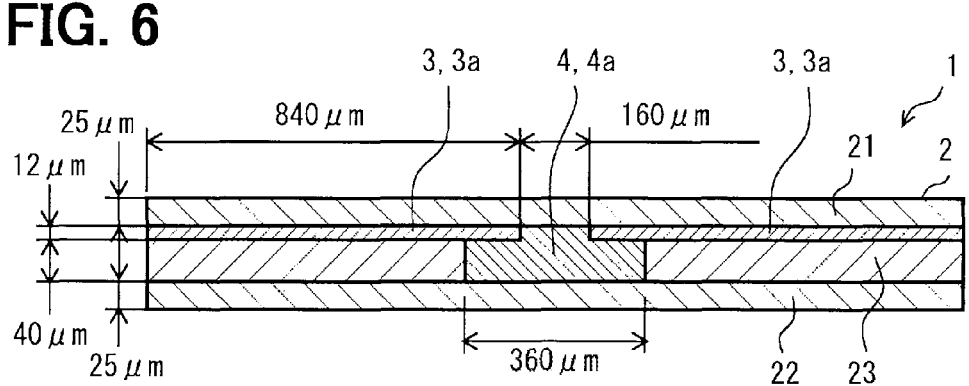
FIG. 6 is a partial enlarged cross sectional view of the radiation heater apparatus according to the first embodiment.

FIGS. 5 and 6 show an example of sizes in the first embodiment. In this example, the surface layer 21 and the back layer 22 are made of the polyimide resin. The surface layer 21 and the back layer 22 provide a thermal conductivity of 0.29 (W/(m·K)) in a representative point. The middle layer 23 is made by the liquid crystal polymer called LCP. The middle layer 23 provides a thermal conductivity of 0.56 (W/(m·K)) in a representative point. The heat radiation parts 3 are made of copper. The heat radiation part 3 provides a thermal conductivity of about 300 (W/(m·K)) in a representative point. The heating part 4 is made of a Ni—Sn alloy. The heating part 4 provides a thermal conductivity of about 80 (W/(m·K)) in a representative point.

According to this example, the thermal conductivity K61 of the first low thermal conductive part 61 is 0.48 (W/(m·K)). The thermal conductivity K62 of the second low thermal conductive part 62 is 5.25 (W/(m·K)). The thermal conductivity K3R in the cross section which crosses the heat radiation part 3 is 35.66 (W/(m·K)). Therefore, a relationship K3R>KP=2·K61+2·K62 is obtained.

In this example, when the body does not contact the surface of the apparatus 1, a heat generation amount of the heating parts 4 is set so that the surface temperature of about 90° C. (degrees Celsius) is obtained on the surface of the surface layer 21 above the heat radiation part 3. Thereby, it is possible to emit the heat radiation R which can give the passenger 12 warmth. The amount of heat generation of the heating part 4 may be adjusted by material of the heating part 4, sizes, and a value of electric current. The surface temperature of the apparatus 1 rapidly rises up to about 90 degrees Celsius. Accordingly, also in winter etc., warmth can be promptly given to a passenger 12.

If a body contacts the surface of the apparatus 1, the surface temperature of the apparatus 1, only in the contact portion, falls rapidly even close to a temperature of the contacting body. For example, as a body contacts the surface of the apparatus 1, a temperature of the contact portion falls to a temperature little higher than a temperature of the contacting body, for example, about 45 degrees Celsius, rapidly. Therefore, it is possible to suppress that a temperature of the portion where the body contacts is maintained at a high temperature over a long period of time. The radiation heater apparatus 1 is configured so that a temperature of a contact portion may fall even to a temperature zone where a human who contacts on the surface may withstand the contact over a short period of time.

Second Embodiment

Figure 7:
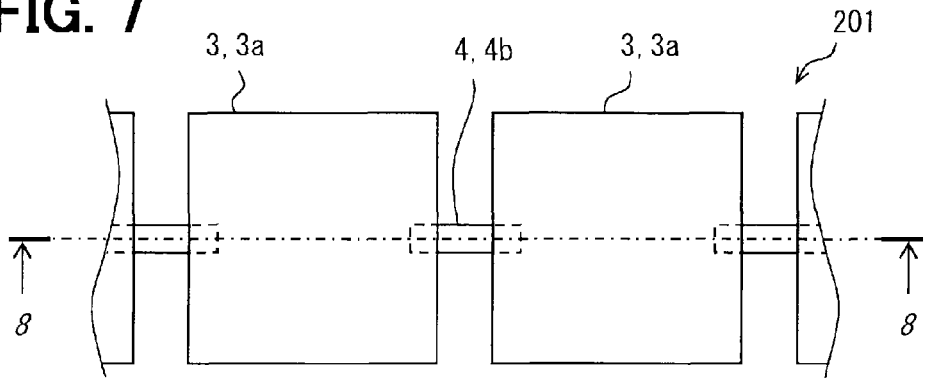
FIG. 7 is a partial enlarged plan view of a radiation heater apparatus according to a second embodiment of the present disclosure.
Figure 8:
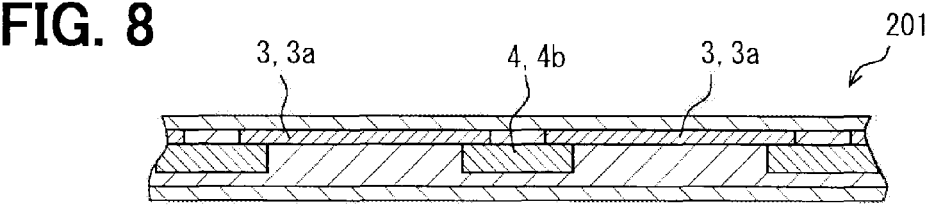
FIG. 8 is a partial enlarged cross sectional view of the radiation heater apparatus according to the second embodiment.

FIGS. 7 and 8 show a part of a radiation heater apparatus 201 in an enlarged manner. FIG. 8 shows a cross-section on an 8-8 line shown in FIG. 7. This embodiment is one of modifications based on a basic form provided by the preceding embodiment. The radiation heater apparatus 201 is a modification in which a part of the radiation heater apparatus 1 is modified.

The heating parts 4b of this embodiment are thinner than the heating parts 4a of the preceding embodiment. The heating parts 4b are only located under the heat radiation parts 3m. According to this configuration, it is possible to lower a thermal volume of the heating parts 4b.

Third Embodiment

Figure 9:
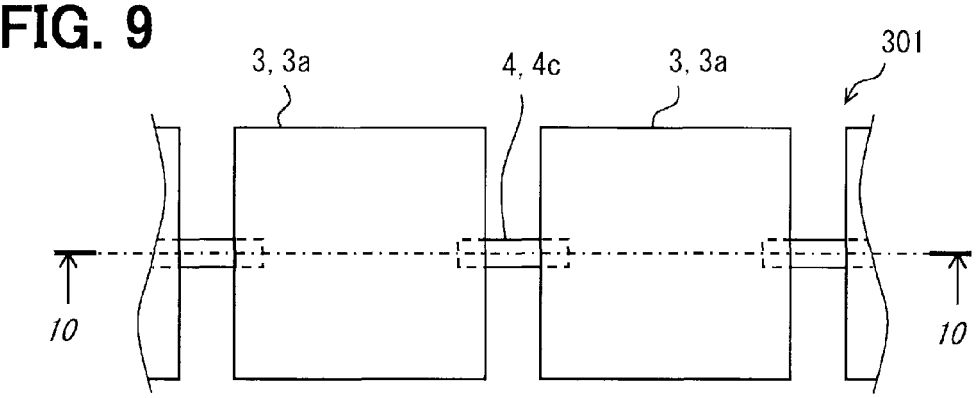
FIG. 9 is a partial enlarged plan view of a radiation heater apparatus according to a third embodiment of the present disclosure.
Figure 10:
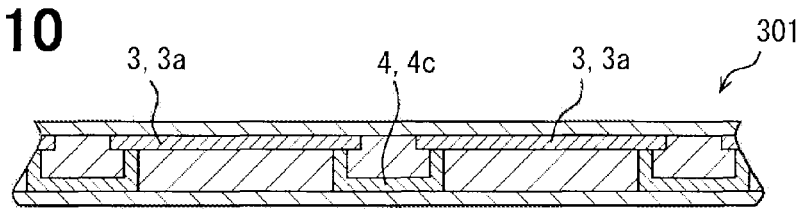
FIG. 10 is a partial enlarged cross sectional view of the radiation heater apparatus according to the third embodiment.

FIGS. 9 and 10 show a part of a radiation heater apparatus 301 in an enlarged manner. FIG. 10 shows a cross-section on a 10-10 line shown in FIG. 9. This embodiment is one of modifications based on a basic form provided by the preceding embodiment. The radiation heater apparatus 301 is a modification in which a part of the radiation heater apparatus 1 is modified.

The heating parts 4c of this embodiment have a configuration which can be called a bracket-shape. The end of the heating part 4c is connected to one of the heat radiation parts 3. The other end of the heating part 4c is connected to other one of the heat radiation parts 3.

According to this structure, the heating parts 4c are thinner than the heating parts 4a of the preceding embodiment. A length from one end of the heating part 4c to the other end is longer than that of the heating part 4a of the preceding embodiment. The length from one end of the heating part 4c to the other end is longer than the distance between adjacent two of the heat radiation parts 3 and 3. Accordingly, heat transfer to one of the heating parts 4 can be reduced.

Fourth Embodiment

Figure 11:
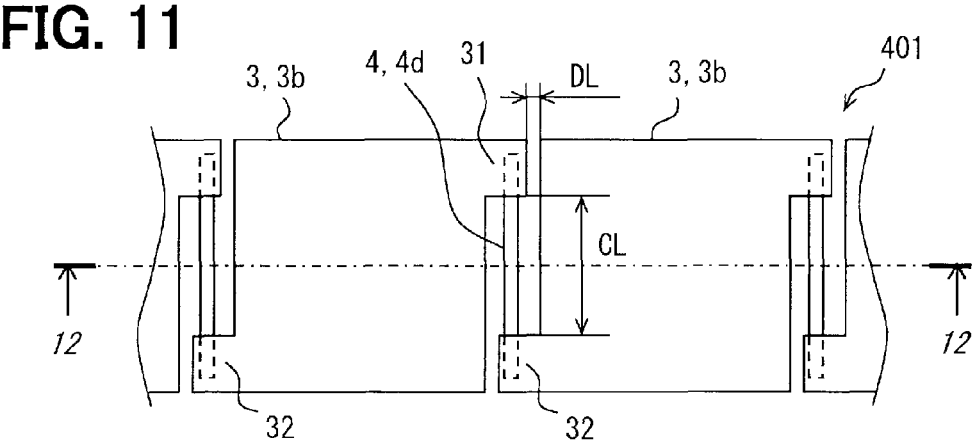
FIG. 11 is a partial enlarged plan view of a radiation heater apparatus according to a fourth embodiment of the present disclosure.
Figure 12:
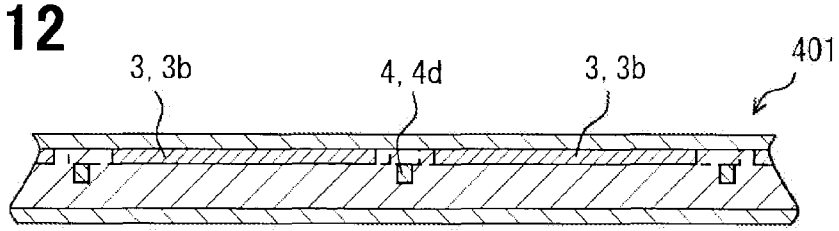
FIG. 12 is a partial enlarged cross sectional view of the radiation heater apparatus according to the fourth embodiment.

FIGS. 11 and 12 show a part of a radiation heater apparatus 401 in an enlarged manner. FIG. 12 shows a cross-section on a 12-12 line shown in FIG. 11. This embodiment is one of modifications based on a basic form provided by the preceding embodiment. The radiation heater apparatus 401 is a modification in which a part of the radiation heater apparatus 1 is modified.

The heat radiation parts 3b of this embodiment are substantially square shapes. However, the heat radiation part 3b has projected tab parts 31 and 32 on along a diagonal line. The tab parts 31 and 32 are projected towards adjacent other heat radiation parts 3b. The tab parts 31 and 32 are positioned so that it may not overlap with the tab part of the other adjacent heat radiation parts 3b. A gap extending along a side of the heat radiation part 3b is defined between a first tab part 31 of one of the heat radiation parts 3b and a second tab part 32 of the other one of the heat radiation parts 3b.

The heating parts 4d of this embodiment are disposed between two portions, which are distanced apart each other, on adjacent two sides provided by adjacent two of the heat radiation parts 3 and 3, and are connected with the heat radiation parts 3 at these two portions. The heating part 4d is disposed between the first tab part 31 and the second tab part 32, and is connected to them. It is said that the heating part 4d connects an upper end of one of the heat radiation part 3 and a lower end of the other one of the heat radiation part 3. According to this structure, a length CL from one end to the other end of the heating part 4d is longer than a distance DL between adjacent two of the heat radiation parts 3 and 3. Accordingly, heat transfer to one of the heating parts 4 can be reduced.

Fifth Embodiment

Figure 13:
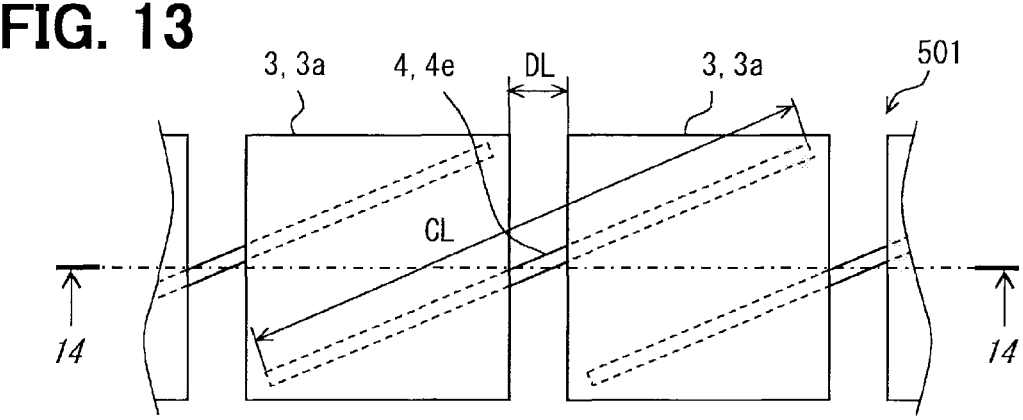
FIG. 13 is a partial enlarged plan view of a radiation heater apparatus according to a fifth embodiment of the present disclosure.
Figure 14:
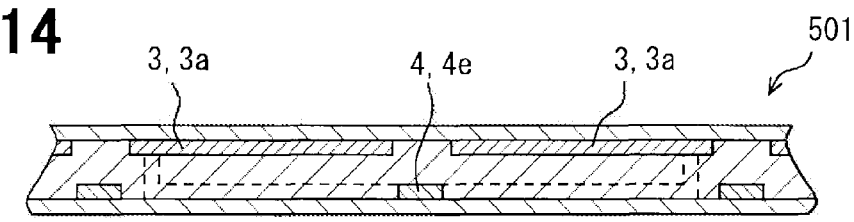
FIG. 14 is a partial enlarged cross sectional view of the radiation heater apparatus according to the fifth embodiment.

FIGS. 13 and 14 show a part of a radiation heater apparatus 501 in an enlarged manner. FIG. 14 shows a cross-section on a 14-14 line shown in FIG. 13. This embodiment is one of modifications based on a basic form provided by the preceding embodiment. The radiation heater apparatus 501 is a modification in which a part of the radiation heater apparatus 1 is modified.

The heating parts 4e of this embodiment are formed between two most distanced corner portions of adjacent two of the heat radiation parts 3 and 3, and are connected with the heat radiation parts 3 at these two corner portions. According to this structure, a length CL from one end to the other end of the heating part 4e is longer than a distance DL between adjacent two of the heat radiation parts 3 and 3. Accordingly, heat transfer to one of the heating parts 4 can be reduced.

Sixth Embodiment

Figure 15:
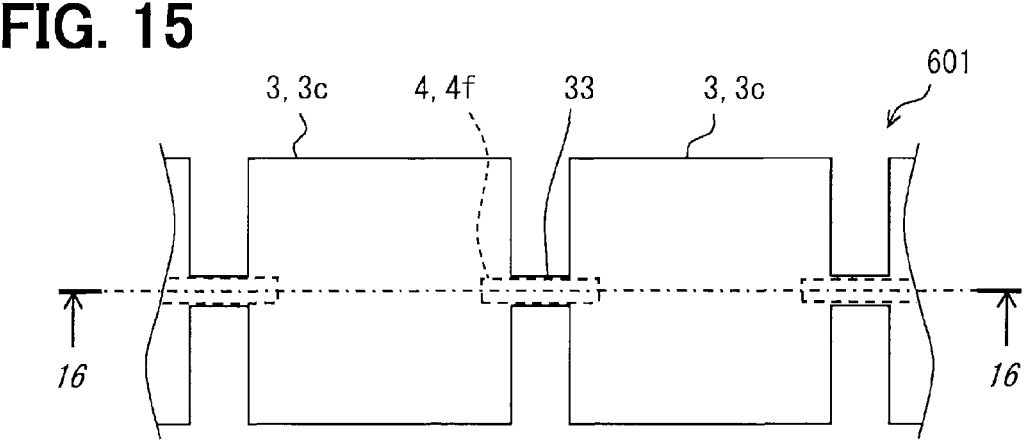
FIG. 15 is a partial enlarged plan view of a radiation heater apparatus according to a sixth embodiment of the present disclosure.
Figure 16:
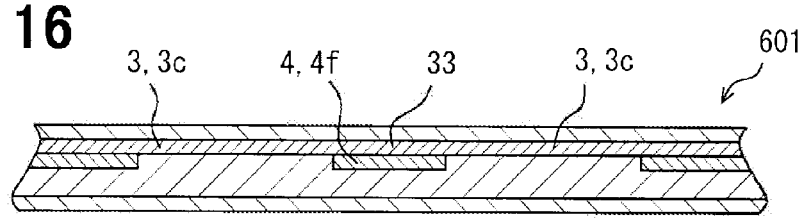
FIG. 16 is a partial enlarged cross sectional view of the radiation heater apparatus according to the sixth embodiment.

FIGS. 15 and 16 show a part of a radiation heater apparatus 601 in an enlarged manner. FIG. 16 shows a cross-section on a 16-16 line shown in FIG. 15. This embodiment is one of modifications based on a basic form provided by the preceding embodiment. The radiation heater apparatus 601 is a modification in which a part of the radiation heater apparatus 1 is modified.

The heat radiation part 3c of this embodiment has the connection part 33 which connects between adjacent two of the heat radiation parts 3c. The connection part 33 is continuously formed with adjacent two of the heat radiation parts 3c and 3c by the same material. According to this structure, the connection part 33 provides thermally narrowed portion. Therefore, the plurality of heat radiation parts 3 are substantially distanced and isolated thermally each other. Moreover, the connection part 33 provides an electrically narrowed portion. The connection part 33 provides an electric high resistance part.

The heating part 4f of this embodiment is arranged under the connection part 33 and is connected to adjacent two of the heat radiation parts 3 and 3. Electric current flows through the heating part 4f at the connection part 33. Accordingly, the heating part 4f can generate heat even if it is arranged in parallel to the connection part 33.

In this structure, a second low thermal conductive part 62 may contain the connection part 33. However, since the connection part 33 is formed narrowly, it is still possible to keep a low level of the thermal conductivity at the second low thermal conductive part 62. According to this structure, it is possible to provide the plurality of heat radiation parts 3 thermally separated each other by members that are mechanically continuous each other.

Seventh Embodiment

Figure 17:
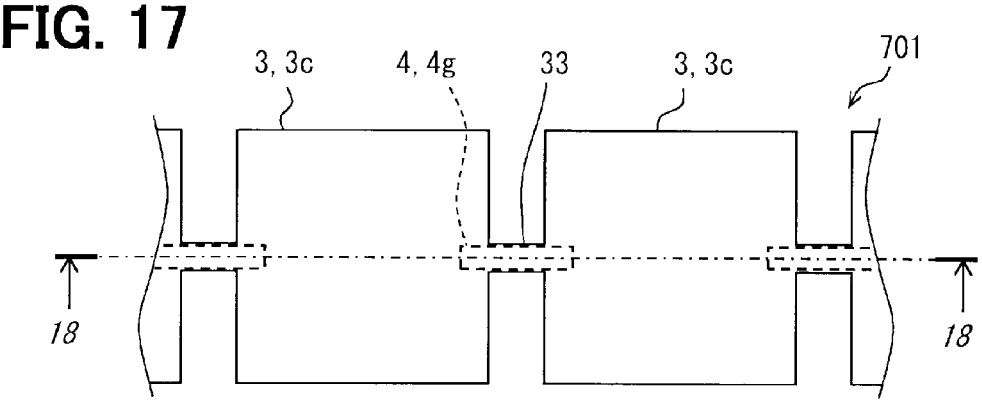
FIG. 17 is a partial enlarged plan view of a radiation heater apparatus according to a seventh embodiment of the present disclosure.
Figure 18:
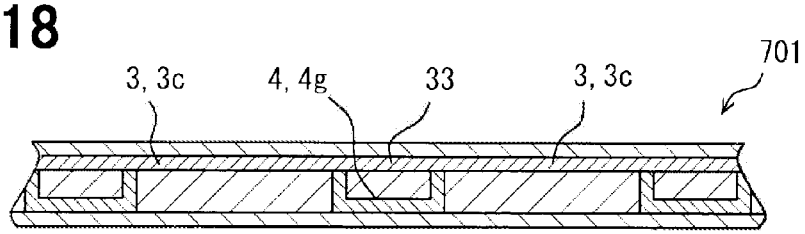
FIG. 18 is a partial enlarged cross sectional view of the radiation heater apparatus according to the seventh embodiment.

FIGS. 17 and 18 show a part of a radiation heater apparatus 701 in an enlarged manner. FIG. 18 shows a cross-section on an 18-18 line shown in FIG. 17. This embodiment is one of modifications based on a basic form provided by the preceding embodiment. The radiation heater apparatus 701 is a modification in which a part of the radiation heater apparatus 601 is modified.

The heating part 4g of this embodiment is arranged under the connection part 33 and is connected to adjacent two of the heat radiation parts 3 and 3. The heating part 4g has a configuration which may be called a bracket shape. One end of the heating part 4g is connected to one of the heat radiation parts 3. The other end of the heating part 4g is connected to other one of the heat radiation parts 3. Electric current flows through the heating part 4g at the connection part 33. Accordingly, the heating part 4g can generate heat even if it is arranged in parallel to the connection part 33. According to this configuration, it is possible to reduce heat transfer through the heating part 4g.

Eighth Embodiment

Figure 19:
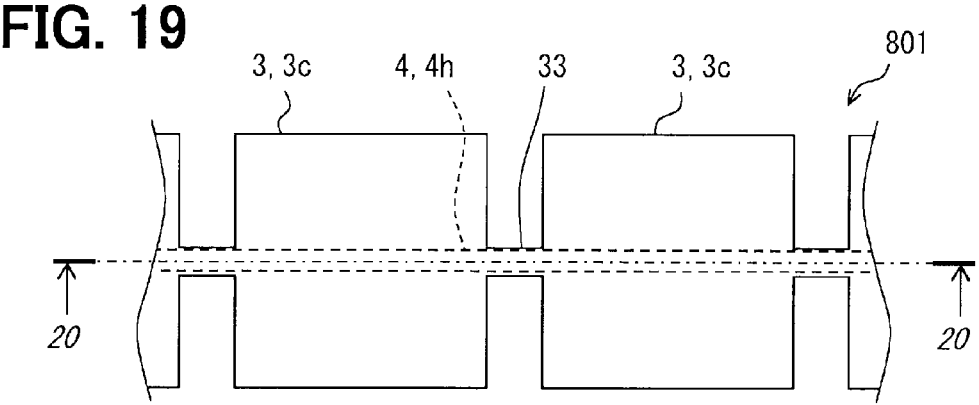
FIG. 19 is a partial enlarged plan view of a radiation heater apparatus according to an eighth embodiment of the present disclosure.
Figure 20:
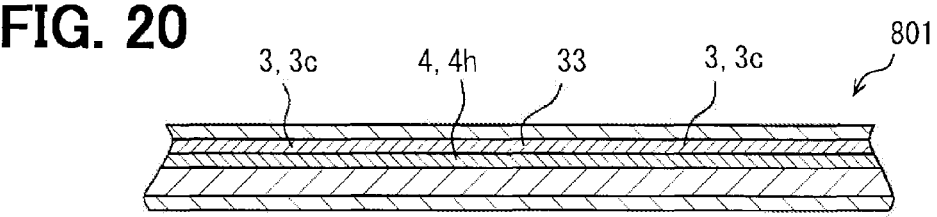
FIG. 20 is a partial enlarged cross sectional view of the radiation heater apparatus according to the eighth embodiment.

FIGS. 19 and 20 show a part of a radiation heater apparatus 801 in an enlarged manner. FIG. 20 shows a cross-section on a 20-20 line shown in FIG. 19. This embodiment is one of modifications based on a basic form provided by the preceding embodiment. The radiation heater apparatus 801 is a modification in which a part of the radiation heater apparatus 601 is modified.

The heating part 4h of this embodiment is arranged under the connection part 33 and is connected to adjacent two of the heat radiation parts 3 and 3. Furthermore, the heating parts 4h are formed in a ribbon shape which continuously extends over a plurality of heat radiation parts 3. Electric current flows more amount in the heating part 4f at the connection part 33. Accordingly, the heating part 4h can generate heat even if it is arranged in parallel to the heat radiation parts 3 and the connection part 33. In this structure, the heating parts 4h can be provided by a series of members which are mechanically continuous.

Ninth Embodiment

Figure 21:
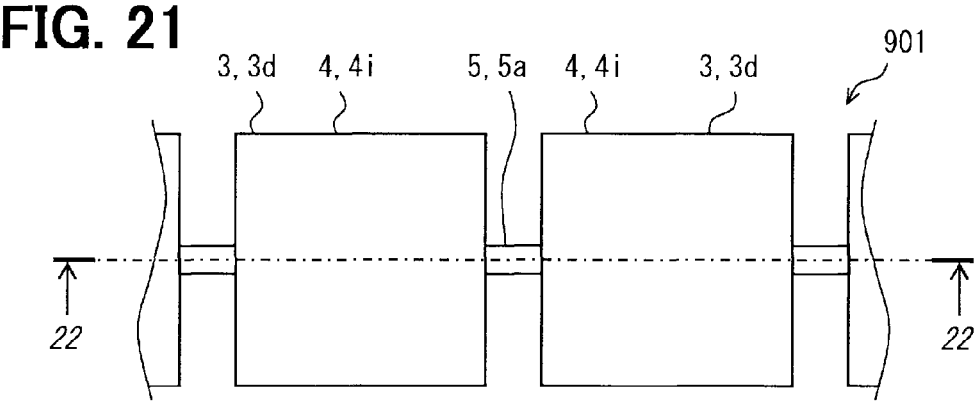
FIG. 21 is a partial enlarged plan view of a radiation heater apparatus according to a ninth embodiment of the present disclosure.
Figure 22:
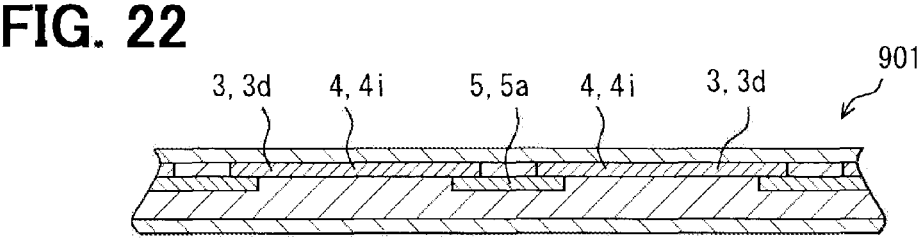
FIG. 22 is a partial enlarged cross sectional view of the radiation heater apparatus according to the ninth embodiment.

FIGS. 21 and 22 show a part of a radiation heater apparatus 901 in an enlarged manner. FIG. 22 shows a cross-section on a 22-22 line shown in FIG. 21. This embodiment is one of modifications based on a basic form provided by the preceding embodiment. The radiation heater apparatus 901 is a modification in which a part of the radiation heater apparatus 1 is modified.

In this embodiment, the heat radiation parts 3 and the heating parts 4 are provided by the same member. The heat radiation parts 3d of this embodiment are squares. Each of the plurality of heat radiation parts 3d are made of material which generates heat by being supplied with electric current. The heat radiation parts 3d are also the heating parts 4i simultaneously.

A conductive wire part 5 for supplying electric current is formed between adjacent two of the heat radiation parts 3d. One end of the conductive wire part 5 is connected to one of the heat radiation parts 3, and the other end of the conductive wire part 5 is connected to the other one of the heat radiation parts 3. The conductive wire part 5a of this embodiment is formed in a straight ribbon shape.

According to this structure, the heat radiation parts 3d and the heating parts 4i are provided by the common member. Therefore, it is possible to improve a thermal efficiency.

Tenth Embodiment

Figure 23:
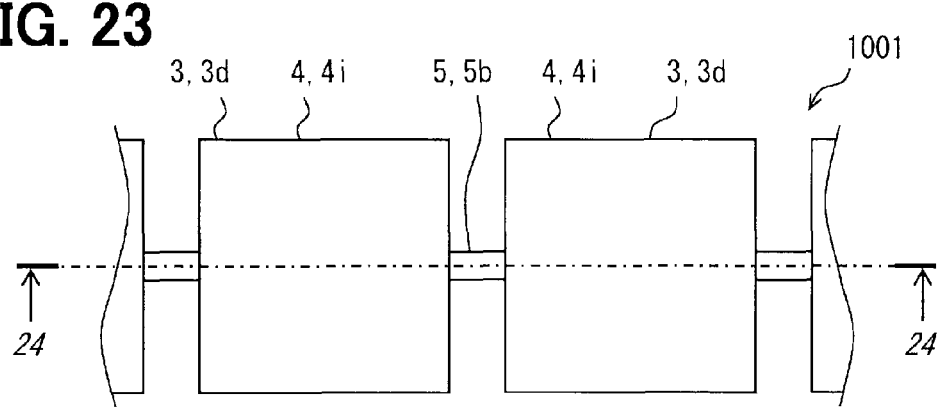
FIG. 23 is a partial enlarged plan view of a radiation heater apparatus according to a tenth embodiment of the present disclosure.
Figure 24:
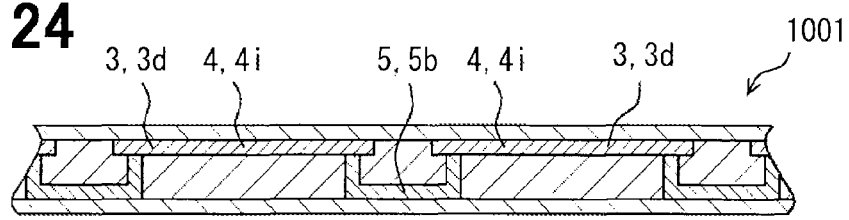
FIG. 24 is a partial enlarged cross sectional view of the radiation heater apparatus according to the tenth embodiment.

FIGS. 23 and 24 show a part of a radiation heater apparatus 1001 in an enlarged manner. FIG. 24 shows a cross-section on a 24-24 line shown in FIG. 23. This embodiment is one of modifications based on a basic form provided by the preceding embodiment. The radiation heater apparatus 1001 is a modification in which a part of the radiation heater apparatus 901 is modified.

The conductive wire part 5b of this embodiment has a configuration which may be called a bracket shape. According to this structure, a length from one end to the other end of the conductive wire part 5b is longer than the conductive wire part 5a in the preceding embodiment. It is possible to reduce heat transfer through the conductive wire part 5b.

Eleventh Embodiment

Figure 25:
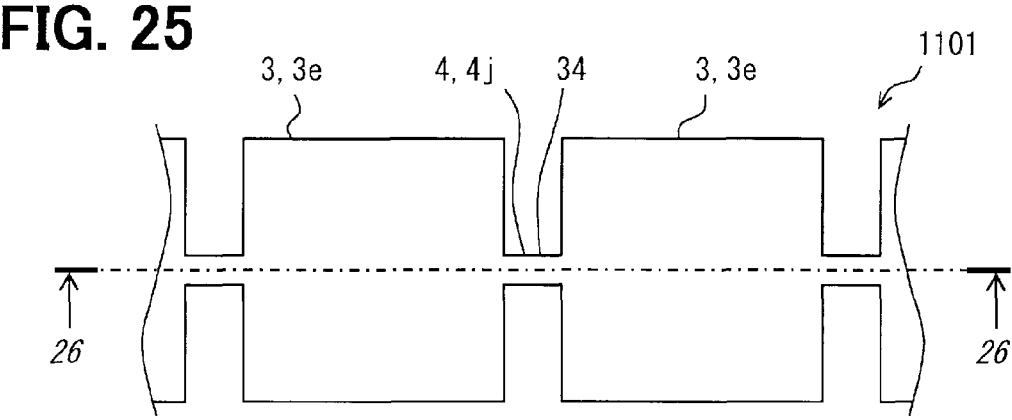
FIG. 25 is a partial enlarged plan view of a radiation heater apparatus according to an 11th embodiment of the present disclosure.
Figure 26:
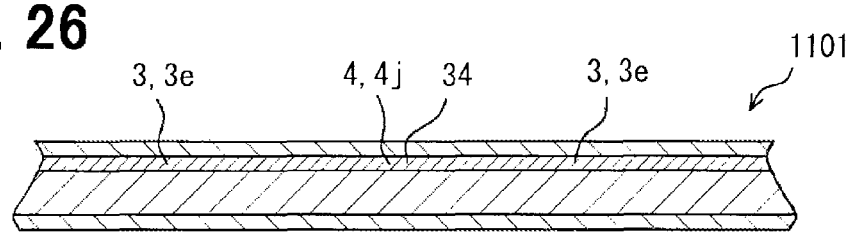
FIG. 26 is a partial enlarged cross sectional view of the radiation heater apparatus according to the 11th embodiment.

FIGS. 25 and 26 show a part of a radiation heater apparatus 1101 in an enlarged manner. FIG. 26 shows a cross-section on a 26-26 line shown in FIG. 25. This embodiment is one of modifications based on a basic form provided by the preceding embodiment. The radiation heater apparatus 1101 is a modification in which a part of the radiation heater apparatus 901 is modified.

In this embodiment, the heat radiation parts 3 and the heating parts 4 are provided by the same member. This embodiment has the connection part 34 which connects between adjacent two of the heat radiation parts 3e and 3e. The connection part 34 is continuously formed with adjacent two of the heat radiation parts 3e and 3e by the same material. The thickness of the connection part 34 is thinner than the thickness of the heat radiation parts 3e. The width of the connection part 34 is apparently narrower than the width of the heat radiation parts 3e. According to this structure, the connection part 34 provides thermally narrowed portion. Therefore, the plurality of heat radiation parts 3e are substantially distanced and isolated thermally each other.

The connection part 34 provides an electrically narrowed portion. The connection part 34 provides an electric high resistance part. As a result, the connection part 34 provides the heating part 4. The connection part 34 is also the heating part 4j of this embodiment. In this embodiment, the whole of the heat radiation parts 3e and the connection parts 34 can generate heat. However, since a current density becomes high at the connection part 34, the connection part 34 mainly works as the heating part 4j. According to this structure, the heat radiation parts 3e and the heating parts 4j can be formed by a single material.

In this embodiment, the whole part of the heating part 4j is arranged within the thin layer which is defined by the thickness of the plurality of heat radiation parts 3a. The whole of one heating part 4j is arranged within the thin layer defined by the heat radiation parts 3a. The heating parts 4j are placed on the same plan where the plurality of heat radiation parts 3a are arranged. The plurality of heat radiation parts 3a and the plurality of heating parts 4j overlap with respect to a surface direction of the heat radiation parts 3a, i.e., a direction parallel to the X-Y plan. The heating part 4j is arranged along with the heat radiation parts 3a with respect to the surface direction of the heat radiation parts 3a, i.e., the direction parallel to the X-Y plan. In other words, whole part of the heating part 4j is placed within a thickness range of the heat radiation parts 3a.

The heating part 4j does not project in the thickness direction of the plurality of heat radiation parts 3a. The heating part 4j does not project from the same plan where the plurality of heat radiation parts 3a are arranged. In other words, the heating part 4j is not placed outside a thickness range of the heat radiation parts 3a.

Twelfth Embodiment

Figure 27:
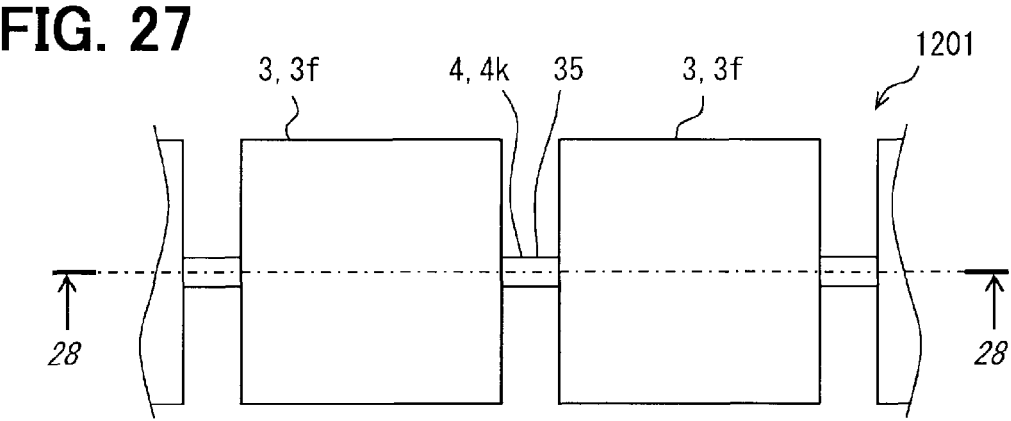
FIG. 27 is a partial enlarged plan view of a radiation heater apparatus according to a 12th embodiment of the present disclosure.
Figure 28:
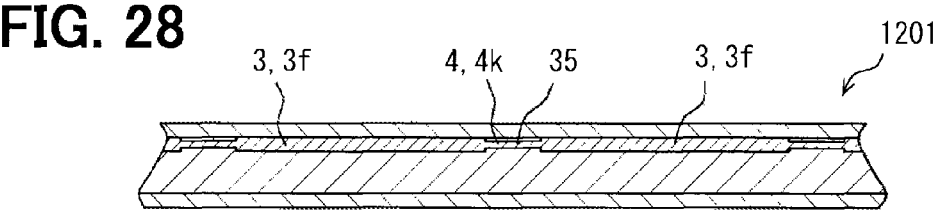
FIG. 28 is a partial enlarged cross sectional view of the radiation heater apparatus according to the 12th embodiment.

FIGS. 27 and 28 show a part of a radiation heater apparatus 1201 in an enlarged manner. FIG. 28 shows a cross-section on a 28-28 line shown in FIG. 27. This embodiment is one of modifications based on a basic form provided by the preceding embodiment. The radiation heater apparatus 1201 is a modification in which a part of the radiation heater apparatus 1101 is modified.

This embodiment has the connection part 35 which connects between adjacent two of the heat radiation parts 3f and 3f. The thickness of the connection part 35 is thinner than the thickness of the heat radiation parts 3f. The connection part 35 provides the heating part 4k. According to this configuration, it is possible to increase current density at the connection part 35. It is possible to reduce heat transfer through the heating part 4e.

In this embodiment, the whole of the heating part 4k is arranged within the thin layer which is defined by the thickness of the plurality of heat radiation parts 3a. The heating part 4k does not project in the thickness direction of the plurality of heat radiation parts 3a. The whole of the heating part 4k is arranged within the thin layer which is defined by the thickness of the plurality of heat radiation parts 3a.

The above-mentioned heat radiation parts 3d, 3e, and 3f are also the heating parts 4i, 4j, and 4k which generate heat by being supplied with electric current. According to this structure, the heat radiation parts 3d, 3e, and 3f and the heating parts 4i, 4j, and 4k are provided by the same member.

Thirteenth Embodiment

Figure 29:
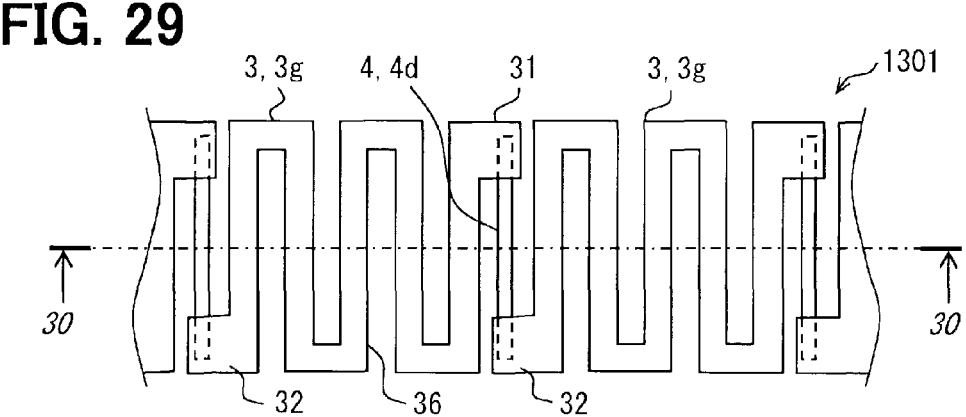
FIG. 29 is a partial enlarged plan view of a radiation heater apparatus according to a 13th embodiment of the present disclosure.
Figure 30:
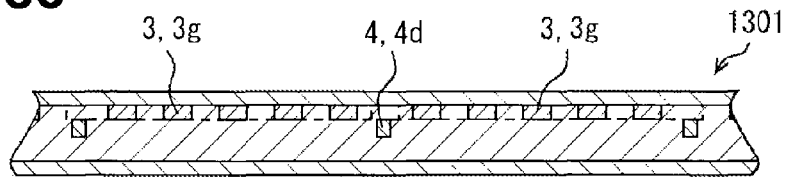
FIG. 30 is a partial enlarged cross sectional view of the radiation heater apparatus according to the 13th embodiment.

FIGS. 29 and 30 show a part of a radiation heater apparatus 1301 in an enlarged manner. FIG. 30 shows a cross-section on a 30-30 line shown in FIG. 29. This embodiment is one of modifications based on a basic form provided by the preceding embodiment. The radiation heater apparatus 1301 is a modification in which a part of the radiation heater apparatus 401 is modified.

The heat radiation parts 3g of this embodiment are in line shapes. The heat radiation parts 3g are arranged in a meandering shape manner. The heat radiation parts 3g are arranged to fill a range of about square shape up with a predetermined density. It can be said that the heat radiation parts 3g are formed in the meandering shapes by a plurality of slit parts 36. The slit part 36 is formed so that it opens at an outer edge of the square range, and it does not cross the square range. As a result, the heat radiation parts 3g are formed to extend in a half turning manner around the slit part 36. The heat radiation parts 3 occupies an area which is suitable to emit the heat radiation R. On the other hand, since the heat radiation part 3g has a line shape, the thermal capacity is reduced.

Fourteenth Embodiment

Figure 31:
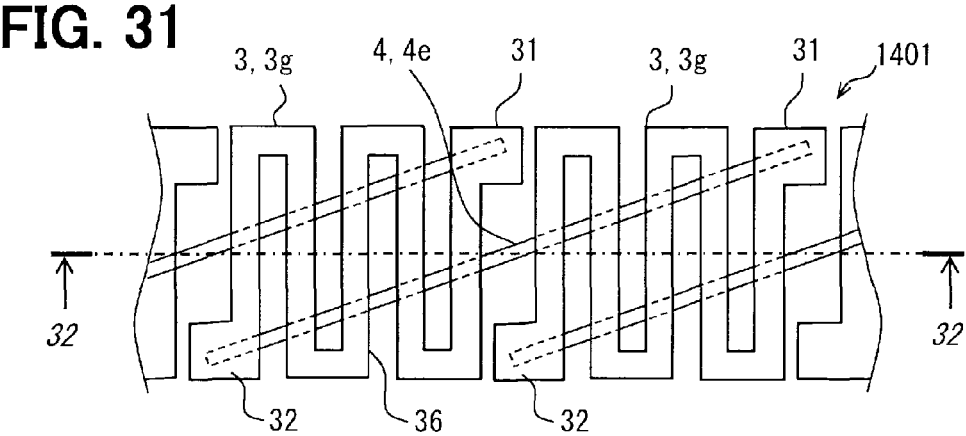
FIG. 31 is a partial enlarged plan view of a radiation heater apparatus according to a 14th embodiment of the present disclosure.
Figure 32:
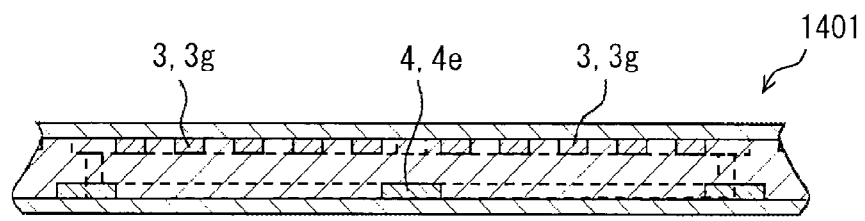
FIG. 32 is a partial enlarged cross sectional view of the radiation heater apparatus according to the 14th embodiment.

FIGS. 31 and 32 show a part of a radiation heater apparatus 1401 in an enlarged manner. FIG. 32 shows a cross-section on a 32-32 line shown in FIG. 31. This embodiment is one of modifications based on a basic form provided by the preceding embodiment. The radiation heater apparatus 1401 is a modification in which a part of the radiation heater apparatus 1401 is modified.

The heating part 4e of this embodiment is disposed between two of the most distanced tab parts 31 and 32 of adjacent two of the heat radiation parts 3 and 3, and is connected with the heat radiation parts 3g and 3g at these two of the tab parts 31 and 32. According to this configuration, it is possible to reduce heat transfer through the heating part 4e.

Fifteenth Embodiment

Figure 33:
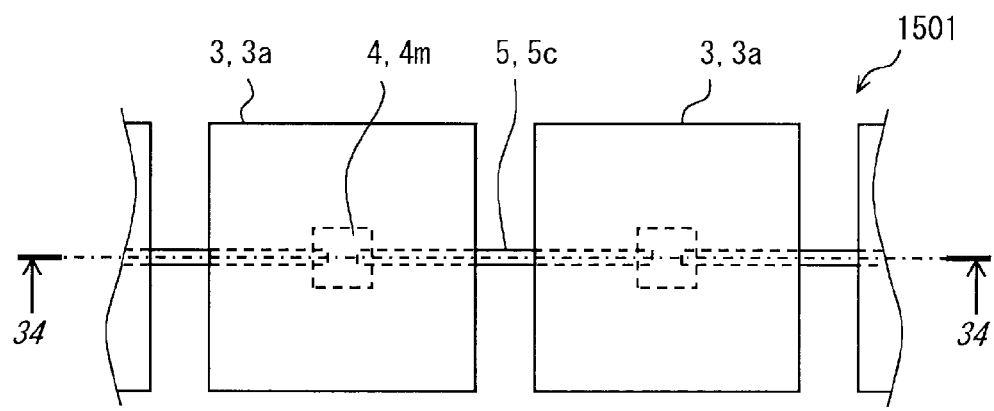
FIG. 33 is a partial enlarged plan view of a radiation heater apparatus according to a 15th embodiment of the present disclosure.
Figure 34:
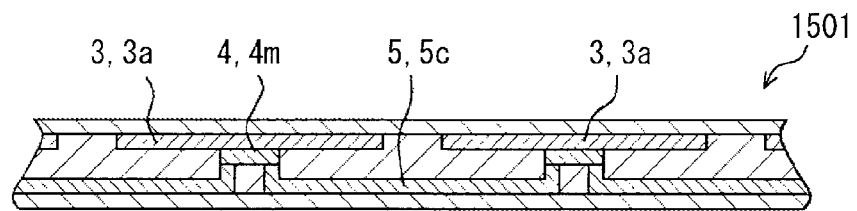
FIG. 34 is a partial enlarged cross sectional view of the radiation heater apparatus according to the 15th embodiment.

FIGS. 33 and 34 show a part of a radiation heater apparatus 1501 in an enlarged manner. FIG. 34 shows a cross-section on a 34-34 line shown in FIG. 33. This embodiment is one of modifications based on a basic form provided by the preceding embodiment. The radiation heater apparatus 1501 is a modification in which a part of the radiation heater apparatus 1 is modified.

In this embodiment, the plurality of heat radiation parts 3 are also arranged to form a grid having n by n (n rows and n columns). Each of the plurality of heating parts 4 is disposed right under a corresponding one of the heat radiation parts 3. The heating parts 4m of this embodiment are formed in a quadrilateral shape. The heating parts 4m are arranged on the center of the heat radiation part 3a which counters. Furthermore, the apparatus 1501 has a plurality of conductive wire parts 5c. The conductive wire part 5c provides current path for supplying power to the plurality of heating parts 4, without taking through the heat radiation part 3.

In above-mentioned embodiment, the heating parts 4a-4h, and 4m are disposed as separated members from the heat radiation parts 3. These heating parts 4a-4h and 4m may be formed by material different from the heat radiation part 3.

In the above-mentioned embodiments, the heating parts 4a-4h, 4i, and 4j, the connection parts 33-35, and the conductive wire parts 5a-5c are disposed between adjacent two of the heat radiation parts 3, and provides a conductor part through which electric current can flow. Therefore, in those embodiments, the low thermal conductive part 6 contains the substrate part 2 and the conductor part, without containing the heat radiation part 3. According to this structure, the low heat-conduction part 6 is provided by the material of the substrate part 2 and the material of the conductor part. Since the substrate part 2 can provide remarkably low thermal conductivity than the heat radiation parts 3, even if the low thermal conductive part 6 contains the conductor part, it is possible to realize a thermal conductivity lower than the thermal conductivity at a cross section containing the heat radiation parts 3. In the above-mentioned embodiments, is desirable that the length of the conductor part along the flowing direction of electric current is longer than the distance between the heat radiation parts 3 which are connected via the conductor part. According to this configuration, it is possible to reduce heat transfer through the conductor part.

Sixteenth Embodiment

Figure 35:
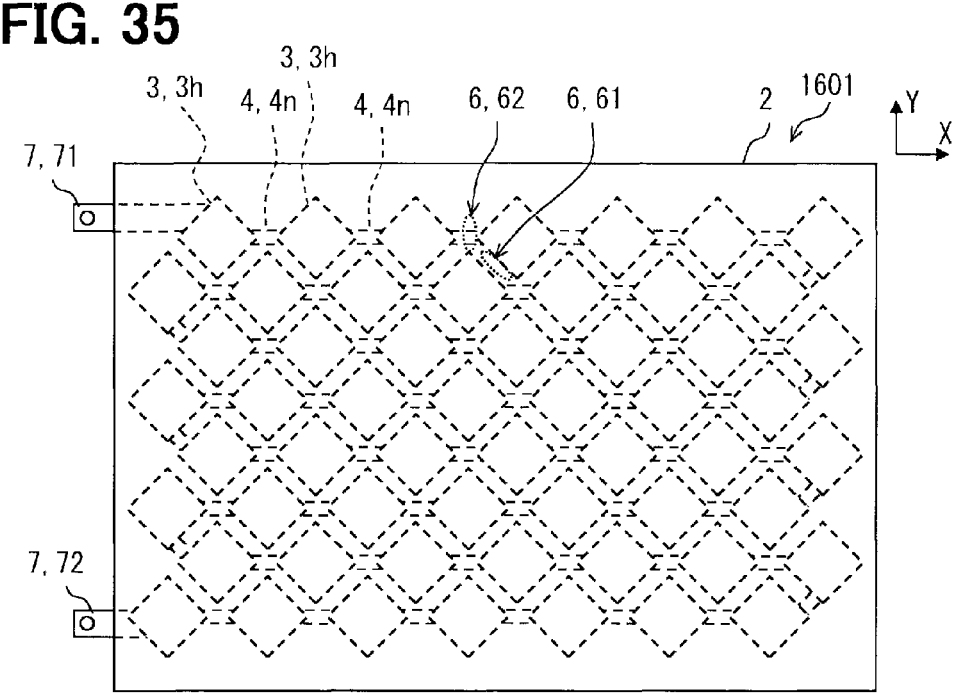
FIG. 35 is a plan view of a radiation heater apparatus according to a 16th embodiment of the present disclosure.

This embodiment is one of modifications based on a basic form provided by the preceding embodiment. FIG. 35 is a plan view of a radiation heater apparatus 1601. The radiation heater apparatus 1601 is a modification in which a part of the radiation heater apparatus 1 is modified.

The radiation heater apparatus 1601 has a plurality of heat radiation parts 3h which are arranged in a distributed manner on a plan of the substrate 2. The plurality of heat radiation parts 3h are independent each other. One of the heat radiation parts 3h is surrounded by the low thermal conductive parts 61, 62 and 63. One of the heat radiation parts 3h is surrounded by the material whose thermal conductivity is lower than the material which forms itself. Each of the plurality of heat radiation parts 3h is a shape which may be called a square shape or a quadrilateral shape. The plurality of heat radiation parts 3h are arranged along an arranging direction so that corner portions of adjacent two of the heat radiation parts 3h oppose each other. In other words, the plurality of heat radiation parts 3h are arranged along the arranging direction which extends along one of the diagonal lines. The arranging direction extends along an electric current path.

The radiation heater apparatus 1601 has a plurality of heating parts 4n for supplying thermal energy to the plurality of heat radiation parts 3h. One of the heating parts 4n is arranged between adjacent two of the heat radiation parts 3h. One of the heating parts 4n is thermally connected with adjacent two of the heat radiation parts 3h. The plurality of heating parts 4n are independent from each other. One of the heating parts 4n is surrounded by the material whose thermal conductivity is lower than the material which forms itself. The plurality of heat radiation parts 3h are arranged closer to the surface of the radiation heater apparatus 1601 than the plurality of heating parts 4n. In other words, the plurality of heating parts 4n are arranged under side of the plurality of heat radiation parts 3h.

The heating part 4n extends as a long strip along an arranging direction on which the plurality of heat radiation parts 3h are arranged. Therefore, a longitudinal direction of the heating part 4n corresponds to a direction of the diagonal line of the heat radiation part 3h. The heating part 4n is arranged to extend long on the diagonal direction of the heat radiation part 3h. According to this structure, it is possible to use the heating parts 4n which are relatively long. The length CL, along the flowing direction of electric current, of the heating parts 4n which are also the conductor parts is longer than the distance DL between the heat radiation parts 3h which are connected by the conductor part. The heating parts 4n, which generates heat by being supplied with electric current, are arranged to be covered with the heat radiation parts 3h except for a part located between the heat radiation parts 3h, i.e., a part extending the distance DL.

The heat radiation part 3h is connected to the heating parts 4n at both ends on the diagonal line thereof. In other words, the heat radiation part 3h has a plurality of projection portions at an outer periphery thereof, and is connected to the heating parts 4n at the projection portions. As a result, the heat radiation part 3h receives the thermal energy supplied from the heating parts 4n via one end on the diagonal line thereof, or via both ends on the diagonal line thereof. In other words, the heat radiation part 3h receives the thermal energy at an end part of the projection portion.

The heat radiation part 3h has an enlarging shape of which width expands gradually towards a center portion from the end on the diagonal line. This enlarging shape is provided with a fan shape or a triangle shape defined by two sides. In other words, the heat radiation part 3h is gradually expanded from a distal end of the projection portion towards a base portion. A cross-sectional area of the heat radiation part 3h gradually increases from the end towards the central portion along the diagonal line.

The heat radiation part 3h conducts the thermal energy along the diagonal line. Simultaneously, the heat radiation part 3h conducts the thermal energy supplied from the heating parts 4n in a diffusing manner in a width direction. In other words, the heat radiation part 3h conducts the thermal energy in a diffusing manner in the width direction to a center portion from one corner portion. The shape of the heat radiation part 3h reduces excessive diffusion of the thermal energy. Therefore, it is possible to realize a gently-sloping temperature distribution over the whole of heat radiation part 3h. The shape of heat radiation part 3h also contributes to provide desirable current distribution.

The heating parts 4n are arranged to be covered with the heat radiation parts 3h except for a part located between the heat radiation parts 3h. In other words, the heating part 4n and the heat radiation part 3h are arranged in an overlapping manner with respect to a direction vertical to a surface from which the heat radiation R is emitted, i.e., a radiation direction of the expected heat radiation R. The heating parts 4n are thermally connected with the heat radiation parts 3h. The heating parts 4n are thermally connected to an underside of the heat radiation parts 3h, i.e., a back face which is opposite from the radiation direction of the heat radiation R expected. This structure provides a good thermal conductivity from the heating parts 4n to the heat radiation parts 3h. Thermal energy flows through the contacting portion between the heating part 4n and the heat radiation part 3h. Furthermore, a thermal conductive path through the substrate part 2 is formed between the heat radiation part 3h and the heating part 4n arranged below the heat radiation part 3h. This structure makes it possible to transfer the thermal energy generated in the heating part 4n to a large area of the heat radiation part 3h in a diffusive manner.

Figure 36:
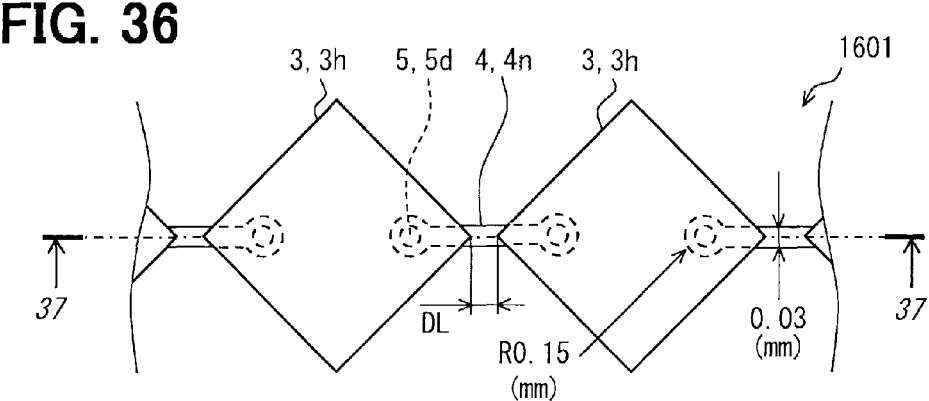
FIG. 36 is a partial enlarged plan view of the radiation heater apparatus according to the 16th embodiment of the present disclosure.
Figure 37:
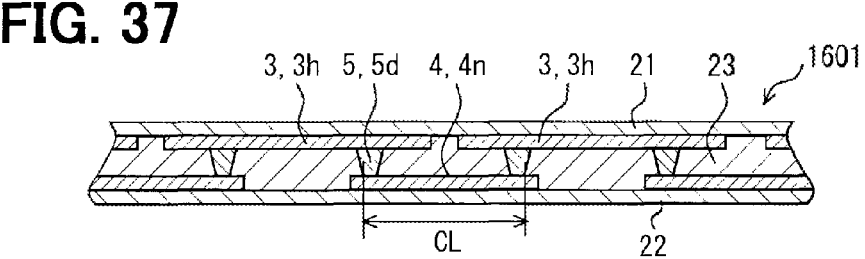
FIG. 37 is a partial enlarged cross sectional view of a radiation heater apparatus according to the 16th embodiment.
Figure 38:
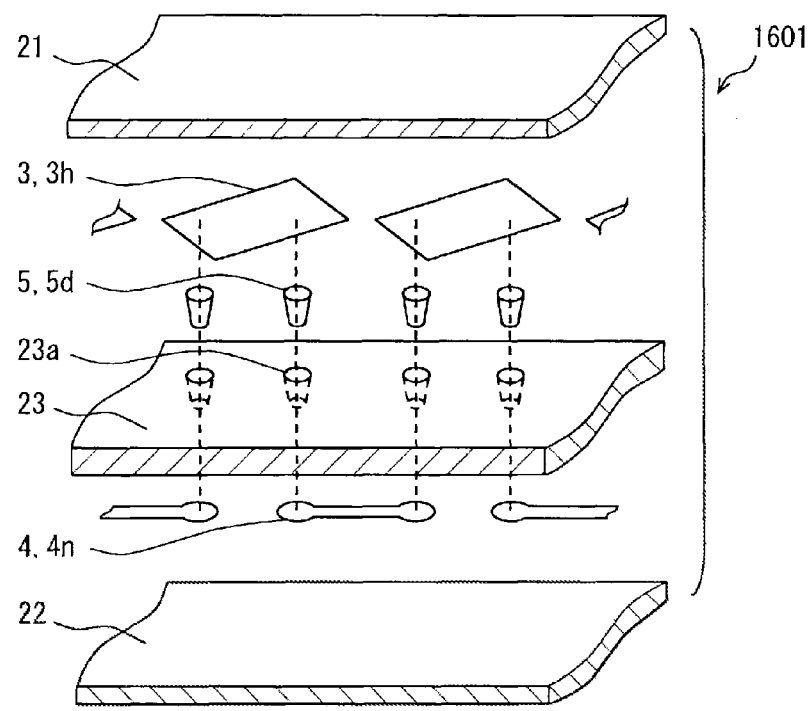
FIG. 38 is an exploded perspective view of the radiation heater apparatus according to the 16th embodiment.

FIG. 36 shows a part of a radiation heater apparatus 1601 in an enlarged manner. FIG. 37 shows a cross-section on a 37-37 line shown in FIG. 36. FIG. 38 is a partial perspective view of the radiation heater apparatus 1601.

The surface layer 21, the back layer 22, and the middle layer 23 are provided with resin material with low thermal conductivities. The plurality of heat radiation parts 3h are provided with thin films made of metal material. The plurality of heat radiation parts 3h are made of copper. The plurality of heat radiation parts 3h are arranged between the surface layer 21 and the middle layer 23. The plurality of heat radiation parts 3h may be attached on an underside of the surface layer 21, or a top side of the middle layer 23.

The plurality of heating parts 4n are provided with thin films made of metal material. The plurality of heating parts 4n are made of copper. The plurality of heating parts 4n are arranged between the middle layer 23 and the back layer 22. The plurality of heating parts 4n may be attached on an underside of the middle layer 23, or a top side of the back layer 22.

The junction parts 5d are arranged between the heat radiation parts 3h and the heating parts 4n. The junction parts 5d are thermally and electrically connected to the heat radiation parts and the heating parts 4n. The junction parts 5d provide the conductive wire parts 5. In this structure, the conductor part is provided by the heating parts 4n and the junction parts 5d. The junction parts 5d are pillar-shaped members. The junction part 5d is formed in a truncated cone shape. The junction part 5d is also called as a connecting via in the technical field of a multilayer substrate. The junction part 5d extends to penetrate the middle layer 23. The junction part 5d is thermally and electrically connected with the heat radiation part 3h at one end thereof. The junction part 5d is thermally and electrically connected with the heating part 4n at the other end thereof. The junction part 5d has a wide bottom surface which is connected with the heat radiation part 3h. The junction part 5d has a narrow bottom surface which is connected with the heating part 4n.

The junction parts 5d are made of metal material which is capable of being thermally and electrically connected to the heat radiation parts and the heating parts 4n. The junction parts 5d are made of Ag—Sn alloy.

Penetration holes 23a through which the junction parts 5d are arranged are formed in the middle layer 23. The junction part 5d is arranged in the penetration hole 23a. The penetration hole 23a is a hole of truncated cone shape. The penetration hole 23a provides a large diameter end and a small diameter end. The shape of the penetration hole 23a provides an advantage to make it easy to push material into in a process step of pushing material for forming the junction part 5d into the penetration hole 23a. The material is pushed from the large diameter end. An example of a manufacturing method includes a process step in which the material in a paste form for forming the junction part 5d is pushed from the large diameter end. In an example of a manufacturing method, a process step in which a plurality of members 21, 3, 23, 4, and 22 are laminated, and a process step in which the laminated members are heated are adopted after the pushing process. In the heating step, the material arranged in the penetration hole 23a is sintered and alloyed to form the junction part 5d. In the heating step, the material arranged in the penetration hole 23a is joined to the heat radiation part 3h. In the heating step, the material arranged in the penetration hole 23a is joined to the heating part 4n.

In the illustrated example, the thickness of the surface layer 21 and the back layer 22 is 25 micrometers. The thickness of the back layer 22 is 80 micrometers. The thickness of the heat radiation parts 3h is 12 micrometers. The diameter of the penetration hole 23a is in a range of 80 micrometers-50 micrometers. The thickness (height) of the junction parts 5d is 80 micrometers. The thickness of the heating parts 4n is 12 micrometers. The heating part 4n is in an iron dumbbell shape having circular connecting parts on both ends of a ribbon-shaped part. The width of the ribbon-shaped part is smaller enough than the heat radiation parts 3h, and smaller than the diameter of the junction parts 5d. The width of the ribbon-shaped part is 30 micrometers. The connecting parts on both ends are larger than the diameter of the junction parts 5d. The connecting part has a radius of 150 micrometers.

According to this embodiment, in addition to the basic advantages explained in the preceding embodiments, the following advantages are acquired. According to this embodiment, it is possible to arrange a comparatively long heating part 4n between adjacent two of the heat radiation parts 3h. Therefore, it is possible to arrange the plurality of heat radiation parts 3h with a high density while using the long heating parts 4n. Since each of the heat radiation parts 3h has a shape of which cross-sectional area expands gradually towards a base portion from the distal end of the projection portion, it is possible to acquire a desirable temperature distribution.

Seventeenth Embodiment

Figure 39:
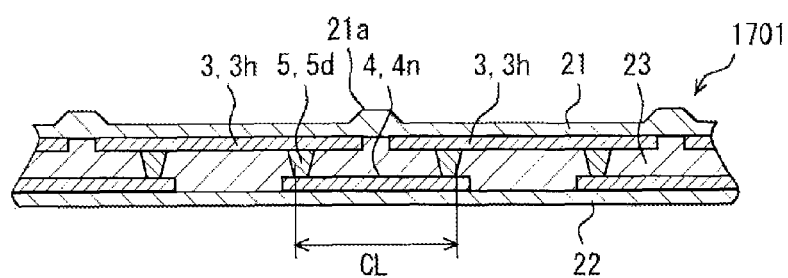
FIG. 39 is a partial enlarged cross sectional view of a radiation heater apparatus according to a 17th embodiment of the present disclosure.

This embodiment is one of modifications based on a basic form provided by the preceding embodiment. FIG. 39 is a partial enlarged cross sectional view of the radiation heater apparatus 1701. The radiation heater apparatus 1701 is a modification in which a part of the radiation heater apparatus 1601 is modified.

The surface layer 21 has a projection part 21a at a position which is between adjacent heat radiation parts 3h and corresponds to right above the heating part 4n. The projection part 21a reduces heat transfer in a thickness direction of the substrate 2 at right above the heating part 4n. The projection part 21a reduces heat transfer along a straight path from the heating part 4n to the surface, without impeding the heat radiation from the heat radiation part 3h.

The projection part 21a may be formed as a plurality of independent projections, or a projected bead part extending along a line which pass through right above the plurality of heating parts 4n. When a body comes in contact with the surface of the radiation heater apparatus 1701, the projection part 21a reduces heat transfer to the body from the heating parts 4n.

Eighteenth Embodiment

Figure 40:
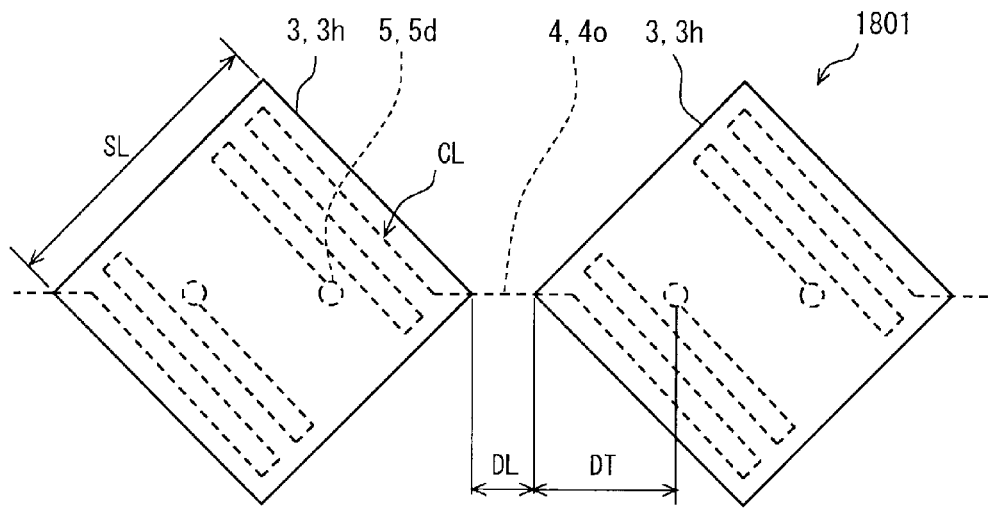
FIG. 40 is a partial enlarged plan view of a radiation heater apparatus according to an 18th embodiment of the present disclosure.

This embodiment is one of modifications based on a basic form provided by the preceding embodiment. FIG. 40 is a partial enlarged plan view of the radiation heater apparatus 1801. The radiation heater apparatus 1801 is a modification in which a part of the radiation heater apparatus 1601 is modified.

This embodiment employs heating parts 4o extending in meandering shapes as illustrated. The length CL, along the flowing direction of electric current, of the heating parts 4o which are also the conductor parts is longer than the distance between the heat radiation parts 3h which are connected by the conductor part. The heating parts 4o are arranged to be covered with the heat radiation parts 3h except for a part located between the heat radiation parts 3h, i.e., a part extending the distance DL. The length CL of the heating parts 4o is longer than a length SL of one side of the heat radiation parts 3h.

The heating parts 4o have meandering parts. The heating parts 4o have bridge parts in straight shapes which are arranged between two of the heat radiation parts 3h. The bridge part is arranged between two meandering parts. A meandering part is arranged to overlap with the heat radiation part 3h. The meandering part is arranged under the heat radiation part 3h. The meandering part has a length longer than a distance DT between a distal end of a projecting portion of the heat radiation part 3h and the junction part 5d. The length of the meandering part is longer than a length of one side of the heat radiation part 3h. The meandering part may be replaced with a spiral shape.

In this structure, the heating parts 4o are arranged to be covered with the heat radiation parts 3h except for a part located between the heat radiation parts 3h. In other words, the heating part 4o and the heat radiation part 3h are arranged in an overlapping manner with respect to a direction vertical to a surface from which the heat radiation R is emitted, i.e., a radiation direction of the expected heat radiation R. The heating parts 4o are thermally connected with the heat radiation parts 3h. In this structure, it is possible to provide a good thermal conductivity from the heating parts 4o to the heat radiation parts 3h.

According to this embodiment, since the heating parts 4o which extends in a zigzag manner are arranged under the heat radiation parts 3h, a temperature distribution on the heat radiation parts 3h can be improved. The long heating part 4o reduces heat transfer passes through the heating part 4o. As a result, it is possible to reduce a surface temperature when a body contacts on a surface of the radiation heater apparatus 1701.

Figure 41:
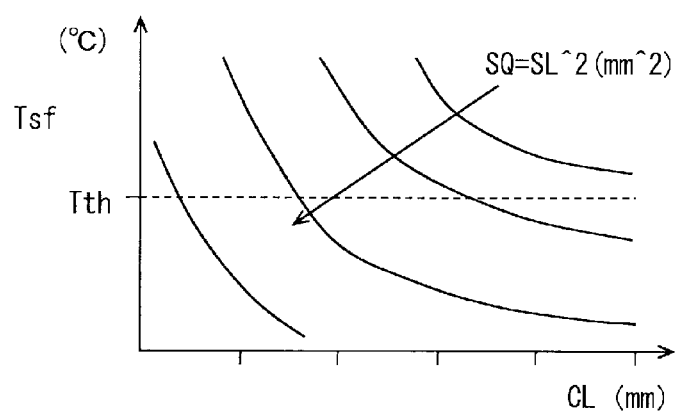
FIG. 41 is a graph showing a relationship between a heater portion length CL and a surface temperature Tsf.

FIG. 41 is a graph showing characteristics of the structure of the radiation heater apparatus 1801. A horizontal axis indicates a length CL (mm: Millimeters) of the heating parts 4o. A vertical axis shows a surface temperature Tsf (° C.: degrees Celsius) of the radiation heater apparatus 1701 when a human finger contacts on the surface of the radiation heater apparatus 1801. An arrow in the drawing shows an increase of an area SQ ($mm^2$: Square Millimeters) of the heat radiation part 3h. The area SQ corresponds to a square of length SL of one side. A plurality of curves in the drawing shows relationships between the length CL and the surface temperature Tsf in a certain area SQ. In the drawing, a target temperature Tth of the surface temperature Tsf is illustrated as an example.

In order to make the surface temperature Tsf lower than the target temperature Tth, it is desirable to lengthen the length CL. On the other hand, the surface temperature Tsf falls as the area SQ increases. Therefore, it is possible to realize Tsf<Tth by setting the area SQ and the length CL in a predetermined value. The area SQ and the length CL are selectively determined to attain Tsf<Tth under a restriction of a thermal-energy supply capacity of the radiation heater apparatus 1801. The target temperature Tth may be set at a temperature which does not make damage on a skin of a human, even if the human contacts the radiation heater apparatus 1801 only a short time and/or over a long time.

Nineteenth Embodiment

Figure 42:
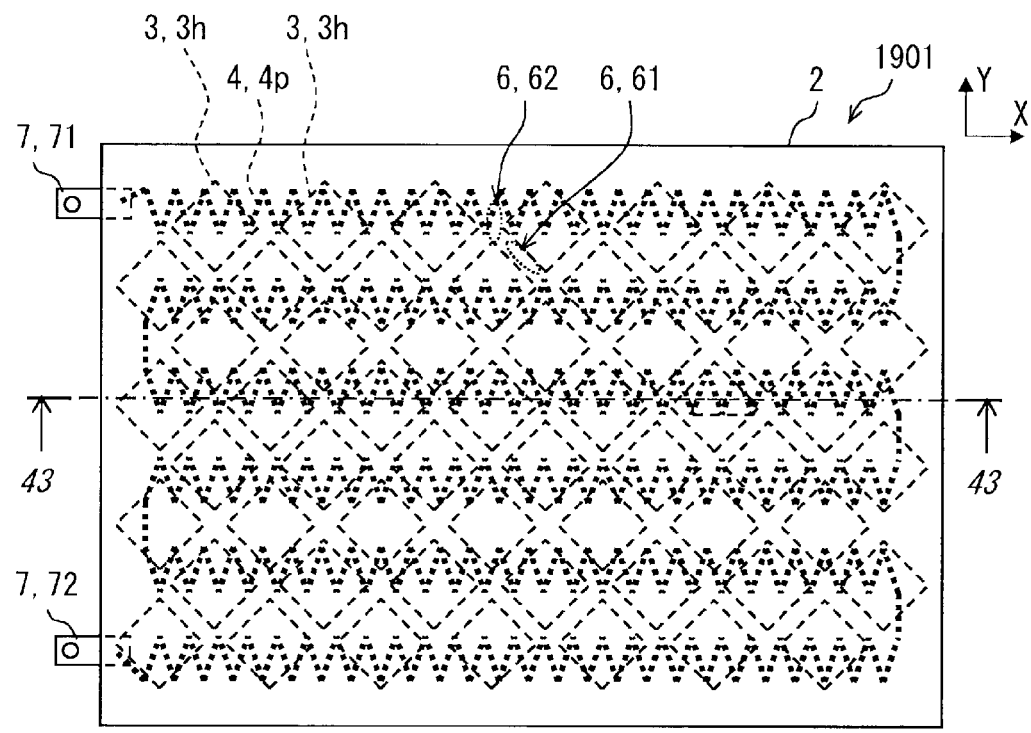
FIG. 42 is a plan view of a radiation heater apparatus according to a 19th embodiment of the present disclosure.
Figure 43:
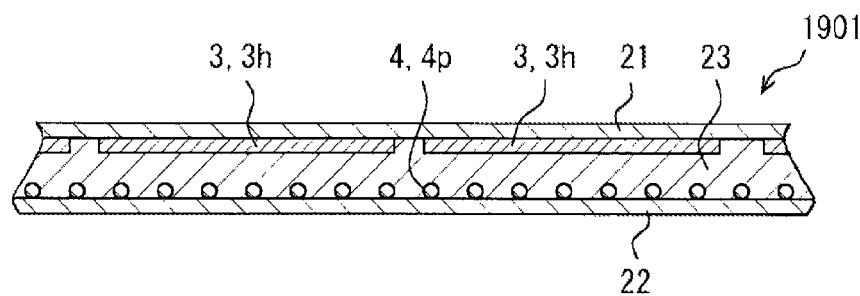
FIG. 43 is a partial enlarged cross sectional view of a radiation heater apparatus according to the 19th embodiment.

This embodiment is one of modifications based on a basic form provided by the preceding embodiment. FIG. 42 is a plan view of a radiation heater apparatus 1901. FIG. 43 is a partial enlarged cross sectional view of a 43-43 line on FIG. 42. The radiation heater apparatus 1901 is a modification in which a part of the radiation heater apparatus 1601 is modified.

A radiation heater apparatus 1901 has a heating part 4p instead of the plurality of heating parts 4n and a plurality of junction parts 5d. The heating part 4p is arranged under the plurality of heat radiation parts 3h. The heating part 4p is arranged to be covered with the heat radiation parts 3h except for a part located between the heat radiation parts 3h. The heating part 4p forms a single layer under the plurality of heat radiation parts 3h. The heating part 4p is arranged in a meandering shape. The heating part 4p is provided by a thin heating wire. The heating part 4p is arranged to form a gap between adjacent two portions. The heating part 4p is made of a metal wire which generates heat by being supplied with electric current. The metal wire is a thin line. The metal wire is made of copper. The diameter of the metal wire is in a range from several micrometers to tens of micrometers.

The plurality of heat radiation parts 3h are distributed widely over almost the whole area of the surface of the radiation heater apparatus 1901. The plurality of heat radiation parts 3h diffuse the thermal energy supplied from the heating part 4p. The plurality of heat radiation parts 3h provide a gently-sloping temperature distribution over a wide range of the surface of the radiation heater apparatus 1901.

The middle layer 23 is disposed between the plurality of heat radiation parts 3h and the heating part 4p. The heating part 4p is a thin metal line and is arranged without being directly connected with the heat radiation parts 3h. The cross-sectional area of the metal wire is not greater than 0.015 $mm^2$ (Square Millimeters). The plurality of heat radiation parts 3h and the heating part 4p have no direct thermal connection. The thermal energy supplied from the heating part 4p is supplied to the plurality of heat radiation parts 3h through the middle layer 23. Therefore, the plurality of heat radiation parts 3h and the heating part 4p have indirect thermal connection. The plurality of heat radiation parts 3h and the heating part 4p are not electrically connected.

The heating part 4p are also arranged to be covered with the heat radiation parts 3h except for a part located between the heat radiation parts 3h. In other words, the heating part 4p and the heat radiation part 3h are arranged in an overlapping manner with respect to a direction vertical to a surface from which the heat radiation R is emitted, i.e., a radiation direction of the expected heat radiation R. The heating part 4p is thermally connected with the heat radiation parts 3h. In this structure, it is possible to provide a good thermal conductivity from the heating part 4p to the heat radiation parts 3h.

The heating part 4p heats a surface temperature of the radiation heater apparatus 1901 to an operating temperature. The operating temperature is a temperature which can emit the heat radiation having a level at which a human placed within tens of cm feels warmth. In a case that a body contacts on the surface of the radiation heater apparatus 1901, the surface temperature of the radiation heater apparatus 1901 at the contacting portion rapidly falls. Since the heating part 4p are provided by the thin wire, heat transfer from the outside of the contacting portion to the contacting portion is reduced. As a result, during the body contacts the surface of the radiation heater apparatus 1901, the surface temperature may be reduced lower than the operating temperature.

Twentieth Embodiment

Figure 44:
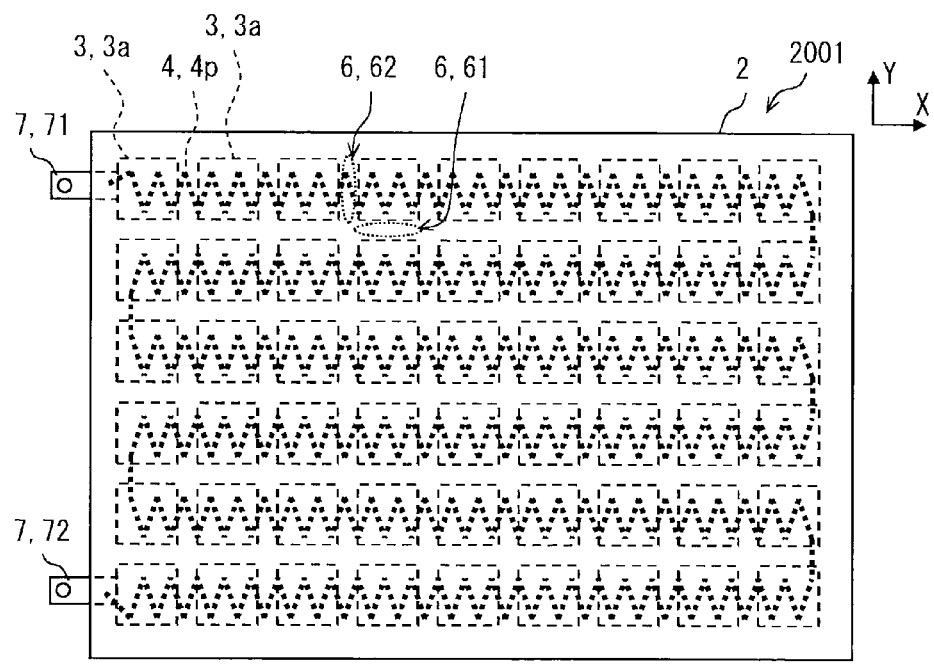
FIG. 44 is a plan view of a radiation heater apparatus according to a 20th embodiment of the present disclosure.

This embodiment is one of modifications based on a basic form provided by the preceding embodiment. FIG. 44 is a plan view of a radiation heater apparatus 2001. The radiation heater apparatus 2001 is a modification in which a part of the radiation heater apparatus 1901 is modified. This embodiment employs the plurality of heat radiation parts 3a and the heating part 4p. In this embodiment, it is possible to achieve similar functions and advantages in the preceding embodiments.

Technical matter may be applied Hereinafter, technical matters which may be applied or is additionally applicable to the preceding embodiments are explained.

In the preceding embodiments, the area SQ of one heat radiation part 3 is set smaller than a potential contacting area between the radiation heater apparatus and a body which may contact with the radiation heater apparatus. In a case that the radiation heater apparatus is provided for a heating application of a room where a human may exist, it is possible to assume that an area of a finger ball of human as the above-mentioned contacting area. It is possible to assume that an area of a finger ball of the second finger of human infants as the above-mentioned contacting area. In this case, the area SQ of the heat radiation part 3 is set smaller than the area of the finger ball of human. The area SQ of the heat radiation part 3 may be set smaller than the finger ball of human infants. The area SQ may be set to not greater than ½ of the contacting area, or not greater than ¼ of the contacting area.

Figure 45:
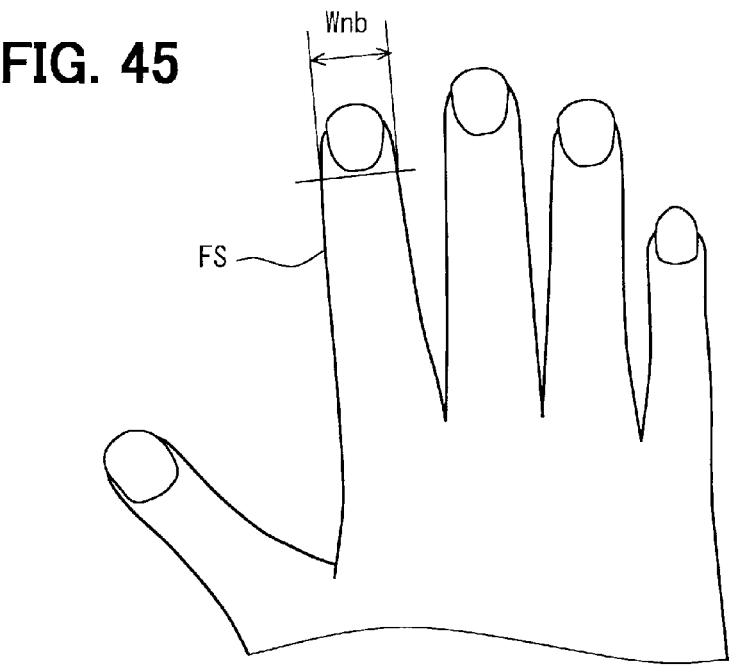
FIG. 45 is a perspective view showing geometry of a human finger.
Figure 46:
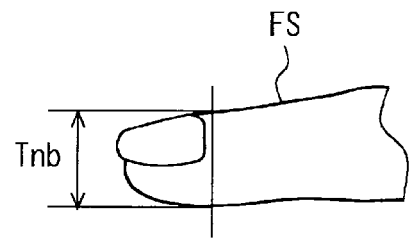
FIG. 46 is a perspective view showing geometry of a human finger.

In FIGS. 45 and 46, a finger of human is illustrated with sizes. The second finger FS has a width Wnb and a thickness Tnb at a base portion of a nail. The area SQ may be set to satisfy $SQ<Wnb^2$ (Wnb×Wnb) and $SQ<Tnb^2$ (Tnb×Tnb). For example, the area SQ may be set based on an average width Wnb and an average thickness Tnb by assuming 1 years-old human infant. It is possible to assume that the width Wnb and the thickness Tnb are about 7 mm. In this case, an assumed contact-area is 49 mm². The area SQ may be assumed as a value not greater than 16 mm², or 10 mm².

Sizes of a finger ball of infants, i.e., the contacting area, may be set based on various statistical data. For example, it is possible to use "Heisei 20 fiscal year, a surveillance study report for the improvement of safety of machine products about construction of a body characteristic data-base of children and visualization simulation technology of a human body damage condition, Incorporated Association The Japan Machinery Federation, Incorporated Association The Research Institute of Human Engineering for Quality Life, http://www.hql.jp/research/before/pdf/children_data2008.pdf". According to this data, an average width Wnb of 1 years-old human infant is 8.8 mm, and an average thickness Tnb is 7.2 mm.

In the preceding embodiments, the thickness and area SQ of the heat radiation part 3 are set to make a heat capacity of the heat radiation part 3 small. The heat capacity of the heat radiation part 3 is set so that a temperature of a portion where the body contacts falls in a short period of time after the body contacts on the surface of the radiation heater apparatus at a location above the heat radiation part. The heat capacity of the heat radiation part 3 is set so that a surface temperature of the radiation heater apparatus at the contacting portion falls lower than a predetermined temperature in a short period of time after the body contacts on the surface of the radiation heater apparatus. In the preferred embodiment, the heat capacity of the heat radiation part 3 is set, in a case that a finger of human contacts on the surface of the radiation heater apparatus, so that the surface temperature of the contacting portion falls lower than 60 degrees Celsius within 0.32 seconds after the contact.

In the preceding embodiments, the specification of the radiation heater apparatus, e.g., the dimension of each part, the performance, and material can be set based on a thermal model. The specification of the radiation heater apparatus is set to realize a necessary thermal-energy supply in condition that a body does not contact on the surface of the radiation heater apparatus. Furthermore, the specification of the radiation heater apparatus is set, in condition that a body contacts on the surface of the radiation heater apparatus, so that a surface temperature of the radiation heater apparatus may fall at least to a temperature which does not damage the body. The specification of the radiation heater apparatus is set to satisfy both two above-mentioned cases. For example, an area SQ of the heat radiation part 3 and a length of the heating part 4 can be set based on the thermal conduction model.

Figure 47:
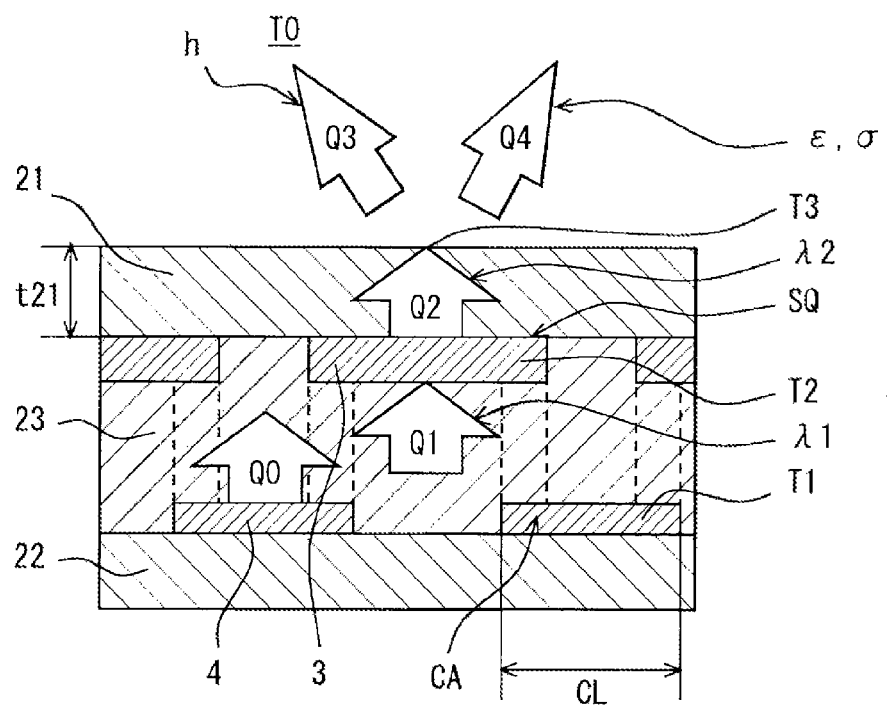
FIG. 47 is a partial cross sectional view showing a thermal conduction model of a radiation heater apparatus.
Figure 48:
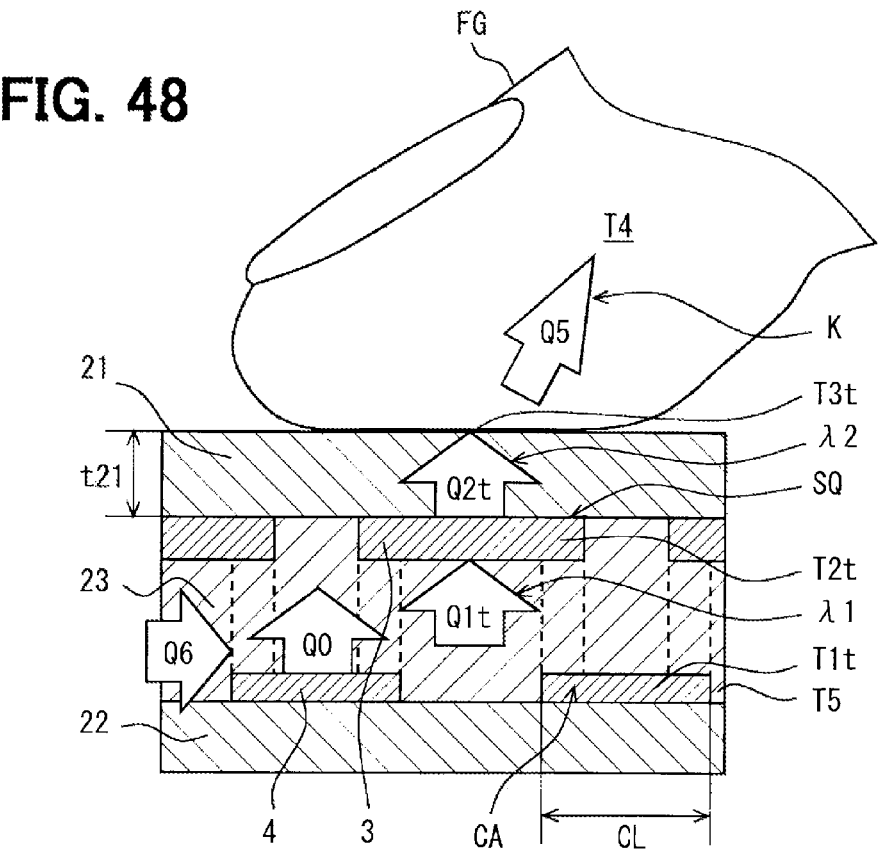
FIG. 48 is a partial cross sectional view showing a thermal conduction model of the radiation heater apparatus.

FIG. 47 shows a thermal conduction model in a condition where a body does not contact on the radiation heater apparatus. FIG. 48 shows the thermal conduction model in a condition where a second human finger contacts the radiation heater apparatus. In this thermal conduction model, a heat flow which goes to the surface (top face) of the radiation heater apparatus among the thermal energy which the heating parts 4 can generate is modeled.

In the drawing, it is assumed that a heat generation amount of one heating part 4 is Q0. Q0 may be calculated based on the material of the heating part 4, the dimension of the heating part 4, and the current flowing through the heating part 4. The heating part 4 has a length CL along the flowing direction of electric current. The heating part 4 has a cross-sectional area CA at a cross section which intersects perpendicularly the longitudinal direction. The temperature of the heating part 4 is T1. The temperature of the heat radiation part 3n is T2. The thermal conductivity in the heat transfer route from the heating part 4 to the heat radiation part 3 is assumed as "λ1" (Lambda-1). In a case that the heating part 4 and the heat radiation part 3 are connected by the heating parts 4 or the conductive wire part 5, it is possible to assume that the thermal conductivity "λ1" (Lambda-1) is the same as the thermal conductivity K4 of the heating part 4 or the conductive wire part 5. The heat transfer amount Q1 transferred to one heat radiation part 3 can be expressed by the following expression (1).

Expression 1

$$Q1 = 2 \cdot \lambda 1 \cdot \frac{CA}{CL/2} \cdot (T1 - T2) \tag{1}$$

An area of the heat radiation part 3 at a side of the surface of the radiation heater apparatus is SQ. The thermal conductivity in the heat transfer route from the heat radiation part 3 to the surface of the radiation heater apparatus is assumed as "$\lambda 2$" (Lambda-2). Since only the surface layer 21 exists between the heat radiation part 3 and the surface of a radiation heater apparatus, it is possible to assume that the thermal conductivity "$\lambda 2$" (Lambda-2) is the same as the thermal conductivity K2 of the surface layer 21. The thickness of the surface layer 21 is t21. A temperature on the surface of the radiation heater apparatus corresponding to the center portion of the heat radiation part 3 is T3. The heat transfer amount Q2 transferred from one heat radiation part 3 to the surface of the radiation heater apparatus can be expressed by the following expression (2).

Expression 2

$$Q2 = \lambda 2 \cdot \frac{SQ}{t21} \cdot (T2 - T3) \tag{2}$$

The heat dissipation from the surface of the radiation heater apparatus is made mainly by the convection and the radiation. A heat transfer rate by free convection is assumed as "h". A temperature of air is T0. The heat dissipation amount Q3 by the convection can be expressed by the following expression (3).

Expression 3

$$Q3 = h \cdot SQ \cdot (T3 - T0) \tag{3}$$

Here, an emissivity from the surface of the radiation heater apparatus is denoted by "$\epsilon$" (Epsilon), and the Stefan-Boltzmann constant is denoted by "$\sigma$" (Sigma). The heat dissipation amount Q4 by the radiation can be expressed by the following expression (4).

Expression 4

$$Q4 = \epsilon \cdot SQ \cdot \sigma \cdot (T3^4 - T0^4) \tag{4}$$

When the radiation heater apparatus is operated stably by being supplied with the rated power, Q0=Q1=Q2=Q3+Q4 is realized. At this time, the surface temperature T3 is stable at a necessary temperature. The specification of the radiation heater apparatus is set so that the surface temperature T3 reaches to the radiation temperature which can supply a necessary heat radiation. For example, the area SQ and the length CL may be used as variable sizes. The area SQ and the length CL are set so that the surface temperature T3 reaches to the radiation temperature. The radiation temperature is a predetermined temperature not less than 60 degrees Celsius, for example.

As a body contacts the surface of the radiation heater apparatus, the convection and the radiation are impeded at least partially. At least a part of heat dissipation from the surface of the radiation heater apparatus is provided by the heat transfer to the contacting body. In a case that the whole surface of one heat radiation part 3 is covered with the contacting body, most of the convection and the radiation are impeded and the heat dissipation is mainly provided by the heat transfer. Thus, as a body contacts, a thermal balance in the radiation heater apparatus is changed. The temperature of the heating part 4 becomes T1t. The temperature of the heat radiation part 3 becomes T2t. The heat transfer amount Q1t transferred to one heat radiation part 3 can be expressed by the following expression (5).

Expression 5

$$Q1t = 2 \cdot \lambda 1 \cdot \frac{CA}{CL/2} \cdot (T1t - T2t) \tag{5}$$

The temperature on the surface of the radiation heater apparatus corresponding to the center portion of the heat radiation part 3 becomes T3t. The heat transfer amount Q2t transferred from one heat radiation part 3 to the surface of the radiation heater apparatus can be expressed by the following expression (6).

Expression 6

$$Q2t = \lambda 2 \cdot \frac{SQ}{t21} \cdot (T2t - T3t) \tag{6}$$

The overall heat transfer coefficient of the contacting body is denoted by K. An amount of heat Q5 dissipated from the heat radiation part 3 directly under the contacting body, i.e., an amount of heat Q5 absorbed by the contacting body can be expressed by the following expression (7).

Expression 7

$$Q5 = K \cdot SQ \cdot (T3t - T4) \tag{7}$$

When a body contacts, the body carries the thermal energy away at the contacting portion. Accordingly, a temperature falls at the contacting portion. However, a high temperature is maintained at the outside portion which surrounds the contacting portion. A temperature of the heating part 3 on the outside of the contacting portion is T5. The amount of heat Q6 transferred to the heat radiation part 3 located at the contacting portion from the outside of the contacting portion can be expressed by the following expression (8).

Expression 8

$$Q6 = 2 \cdot \lambda 1 \cdot \frac{CA}{CL/2} \cdot (T5 - T1t) \tag{8}$$

When the rated power is supplied to the radiation heater apparatus, a body of something may contact a portion of the surface of the radiation heater apparatus. In this case, the surface temperature T3 falls due to an amount of heat which the body carries away. Then, a thermal balance is obtained at the contacting portion, Q6+Q0=Q1t=Q2t=Q5 is realized. At this time, the surface temperature T3t is stable at a temperature lower than the radiation temperature. The specification of the radiation heater apparatus is set so that the surface temperature T3t reaches to a suppressed temperature which is capable of protecting the contacting body. For example, the area SQ and the length CL may be used as variable sizes. The area SQ and the length CL are set so that the surface temperature T3 reaches to the suppressed temperature. The suppressed temperature is a predetermined temperature less than 50 degrees Celsius, for example.

In a case that the contacting body has sufficient heat dissipation function, the contacting body can carry away a predetermined amount of heat. An amount of heat which the contacting body is capable of carrying away is QH. For example, in a case that a part of human, e.g., a finger contacts on, heat can be carried away by the blood flow. An area SQ of the heat radiation part 3 is set, so that an amount of heat to be transferred from the heat radiation part 3 to the part of a human, i.e., Q2t, is smaller than an amount of heat Qh which the part of a human is capable of carrying away. By realizing Q2t=Q5<Qh, the surface temperature T3t converges to a temperature which is higher than a temperature of a part of a human, i.e., a body temperature, but is close to the body temperature. In a case that assuming a part of human contacts on, the suppressed temperature may be set not greater than 40 degrees Celsius.

Twenty-First Embodiment

Figure 49:
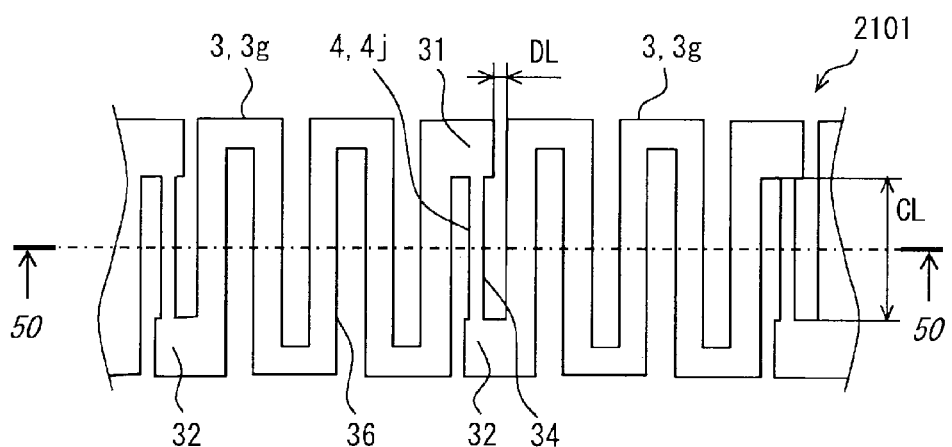
FIG. 49 is a partial enlarged plan view of a radiation heater apparatus according to a 21st embodiment of the present disclosure.
Figure 50:
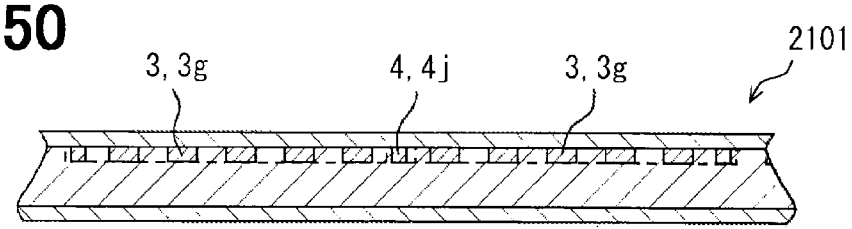
FIG. 50 is a partial enlarged cross sectional view of the radiation heater apparatus according to the 21st embodiment.

FIGS. 49 and 50 show a part of a radiation heater apparatus 2101 in an enlarged manner. FIG. 50 shows a cross-section on a 50-50 line shown in FIG. 49. This embodiment is one of modifications based on a basic form provided by the preceding embodiment. The radiation heater apparatus 2101 is a modification in which a part of the radiation heater apparatus 1 is modified.

The heat radiation parts 3g of this embodiment are substantially square shapes. However, the heat radiation part 3g has projected tab parts 31 and 32 on a diagonal line. The tab parts 31 and 32 are projected towards adjacent other heat radiation parts 3g. The tab parts 31 and 32 are positioned so that it may not overlap with the tab part of the other adjacent heat radiation parts 3g. A gap extending along a side of the heat radiation part 3g is defined between a first tab part 31 of one of the heat radiation parts 3g and a second tab part 32 of the other one of the heat radiation parts 3g.

This embodiment has connection parts 34 which connects between adjacent two of the heat radiation parts 3g and 3g. The connection parts 34 provide the heating parts 4j. The heating parts 4j disposed between two portions, which are distanced apart each other, on adjacent two sides provided by adjacent two of the heat radiation parts 3 and 3, and are connected with the heat radiation parts 3 at these two portions. The heating part 4j is disposed between the first tab part 31 and the second tab part 32, and are connected to them. It is said that the heating part 4j connects an upper end of one of the heat radiation part 3 and a lower end of the other one of the heat radiation part 3. According to this structure, a length CL from one end to the other end of the heating part 4e is longer than a distance DL between adjacent two of the heat radiation parts 3 and 3. Accordingly, heat transfer to one of the heating parts 4 can be reduced.

The heat radiation parts 3g of this embodiment are in line shapes. The heat radiation parts 3g are arranged in a meandering shape manner. The heat radiation parts 3g are arranged to fill a range of about square shape up with a predetermined density. It can be said that the heat radiation parts 3g are formed in the meandering shapes by a plurality of slit parts 36. The slit part 36 is formed so that it opens at an outer edge of the square range, and it does not cross the square range. As a result, the heat radiation parts 3g are formed to extend in a half turning manner around the slit part 36. The heat radiation parts 3 occupies an area which is suitable to emit the heat radiation R. On the other hand, since the heat radiation part 3g has a line shape, the thermal capacity is reduced.

Twenty-Second Embodiment

Figure 51:
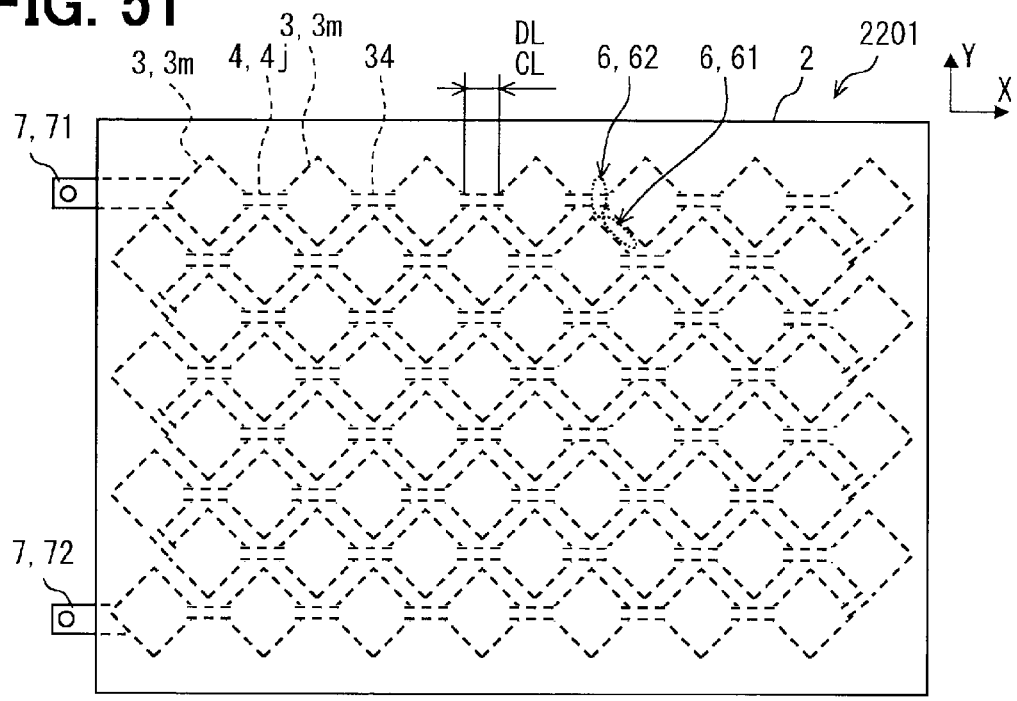
FIG. 51 is a plan view of a radiation heater apparatus according to a 22nd embodiment of the present disclosure.

This embodiment is one of modifications based on a basic form provided by the preceding embodiment. FIG. 51 is a plan view of a radiation heater apparatus 2201. The radiation heater apparatus 2201 is a modification in which a part of the radiation heater apparatus 1 is modified.

The radiation heater apparatus 2201 has a plurality of heat radiation parts 3m which are arranged in a distributed manner on a plan of the substrate 2. The plurality of heat radiation parts 3m are independent each other. One of the heat radiation parts 3m is surrounded by the low thermal conductive parts 61, 62 and 63. One of the heat radiation parts 3m is surrounded by portions whose thermal conductivity is lower than the material which forms itself. Each of the plurality of heat radiation parts 3m is a shape which may be called a square shape or a quadrilateral shape. The plurality of heat radiation parts 3m are arranged along an arranging direction so that corner portions of adjacent two of the heat radiation parts 3m oppose each other. In other words, the plurality of heat radiation parts 3m are arranged along an arranging direction which extends along one of the diagonal lines. The arranging direction extends along an electric current path.

The radiation heater apparatus 2201 has a plurality of heating parts 4j for supplying thermal energy to the plurality of heat radiation parts 3m. The heating part 4j is provided by a connection part 34. One heating part 4j is arranged between adjacent two of the heat radiation parts 3m. One of the heating parts 4j is thermally connected with adjacent two of the heat radiation parts 3m. The heat radiation part 3m and the heating part 4j are provided by the same continuous material.

The heating part 4j extends as a long strip along an arranging direction on which the plurality of heat radiation parts 3m are arranged. Therefore, a longitudinal direction of the heating part 4j corresponds to a direction of the diagonal line of the heat radiation part 3m. The heating part 4j is arranged to extend long on the diagonal line of the heat radiation part 3m. According to this structure, it is possible to use the heating parts 4j which are relatively long. The length CL, along an electric current direction, of the heating parts 4j which are also the conductor parts is equal to the distance DL between the heat radiation parts 3m which are connected by the conductor part.

The heat radiation part 3m is continuous with the heating parts 4j at both ends on the diagonal line thereof. In other words, the heat radiation part 3m has a plurality of projection portions at an outer periphery thereof, and is continuous with the heating parts 4j at the projection portions. As a result, the heat radiation part 3m receives the thermal energy supplied from the heating parts 4j via one end on the diagonal line thereof, or via both ends on the diagonal line thereof. In other words, the heat radiation part 3m receives the thermal energy at an end part of the projection portion.

The heat radiation part 3m has an enlarging shape of which width expands gradually towards a center portion from the end on the diagonal line. This enlarging shape is provided with a fan shape or a triangle shape defined by two sides. In other words, the heat radiation part 3m is gradually expanded from a distal end of the projection portion towards a base portion. A cross-sectional area of the heat radiation part 3m gradually increases from the end towards the central portion along the direction of the diagonal direction.

The heating part 4j is apparently narrow compared with the heat radiation part 3m. Therefore, the connecting part 37 can be recognized between the heat radiation part 3m and the heating part 4j. The connecting part 37 is a part which may also be called a boundary. The connecting part 37 is also a heat-input part to the heat radiation part 3m.

The heat radiation part 3m has a length RL along the flowing direction of electric current. The length RL is also a length of a line which connects two connecting parts 37 and 37. The length RL is also a length of the heat radiation part 3m along a heat transfer direction. The heat radiation part 3m has a width RW about a direction perpendicular to the flowing direction of electric current. The width RW of the heat radiation part 3m is also a width about a direction perpendicular to a line which connects two connecting parts 37 and 37. Therefore, the width RW is also a width to the heat transfer direction at the heat radiation part 3m. A plan shape of the heat radiation part 3m is shaped so that the width RW increases from the connecting part 37 gradually along with the length RL. The width RW becomes the maximum at a center along the direction of the length RL.

The heat radiation part 3m conducts the thermal energy along the diagonal line. Simultaneously, the heat radiation part 3m conducts the thermal energy supplied from the heating parts 4j in a diffusing manner in the width direction. In other words, the heat radiation part 3m conducts the thermal energy in a diffusing manner in the width direction to a center portion from one end. The shape of the heat radiation part 3m reduces excessive diffusion of the thermal energy. Therefore, it is possible to realize a gently-sloping temperature distribution over the whole of heat radiation part 3m. The shape of heat radiation part 3m also contributes to provide desirable current distribution.

Figure 52:
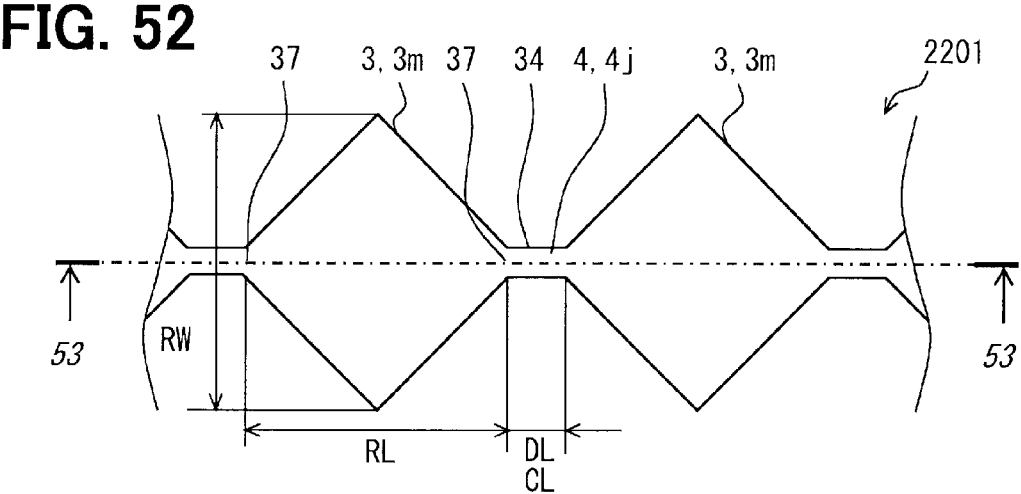
FIG. 52 is a partial enlarged plan view of the radiation heater apparatus according to the 22nd embodiment.
Figure 53:
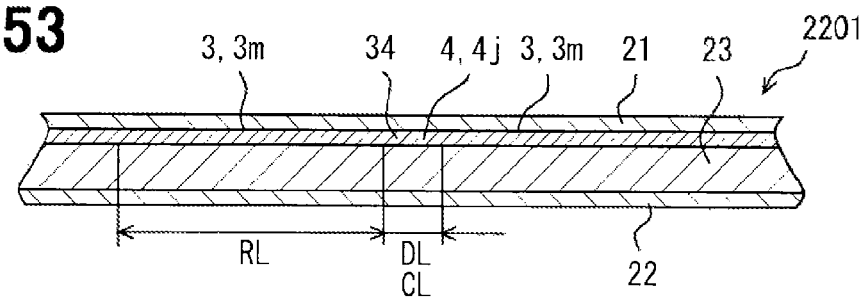
FIG. 53 is a partial enlarged cross sectional view of the radiation heater apparatus according to the 22nd embodiment.

FIGS. 52 and 53 show a part of a radiation heater apparatus 2201 in an enlarged manner. FIG. 53 shows a cross-section on a 53-53 line shown in FIG. 52.

The surface layer 21, the back layer 22, and the middle layer 23 are provided with resin material with low thermal conductivities. A plurality of heat radiation parts 3m and the heating parts 4j are provided with thin films made of metal material. The plurality of heat radiation parts 3m and the heating parts 4j are made of copper. The plurality of heat radiation parts 3m and the heating parts 4j are arranged between the surface layer 21 and the middle layer 23. The plurality of heat radiation parts 3m and the heating parts 4j may be attached on an underside of the surface layer 21, or a top side of the middle layer 23.

According to this embodiment, in addition to the basic advantages explained in the preceding embodiments, the following advantages are acquired. According to this embodiment, it is possible to arrange comparatively long heating parts 4j between adjacent two of the heat radiation parts 3m. Therefore, it is possible to arrange the plurality of heat radiation parts 3m with a high density while using the long heating parts 4j. Since each of the heat radiation parts 3m has a shape of which cross-sectional area expands gradually towards a base portion from the distal end of the projection portion, it is possible to acquire a desirable temperature distribution.

Twenty-Third Embodiment

Figure 54:
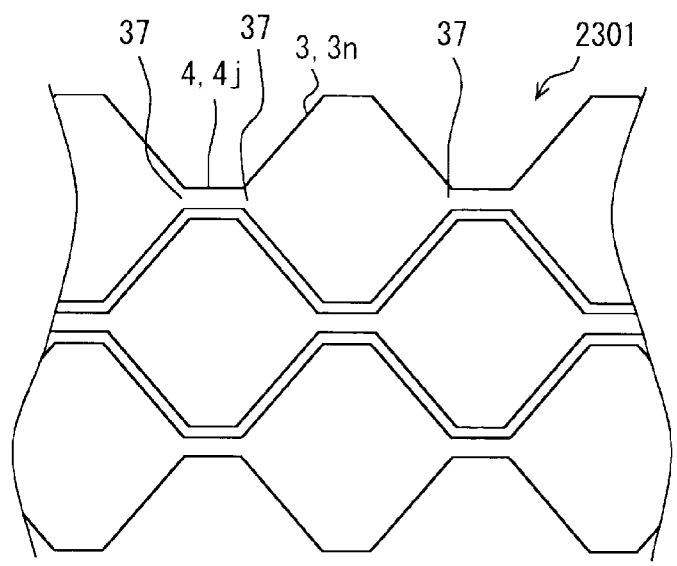
FIG. 54 is a partial enlarged plan view of a radiation heater apparatus according to a 23rd embodiment of the present disclosure.

This embodiment is one of modifications based on a basic form provided by the preceding embodiment. FIG. 54 is a partial enlarged plan view of the radiation heater apparatus 2301. The radiation heater apparatus 2301 is a modification in which a part of the radiation heater apparatus 2201 is modified. The heat radiation part 3n has a side which is parallel to a rectangular shaped heating part 4j. The heat radiation parts 3n are polygons. The heat radiation parts 3n are hexagons. According to this structure, the heat radiation parts 3n and the heating parts 4j can be arranged with a high density.

Twenty-Fourth Embodiment

Figure 55:
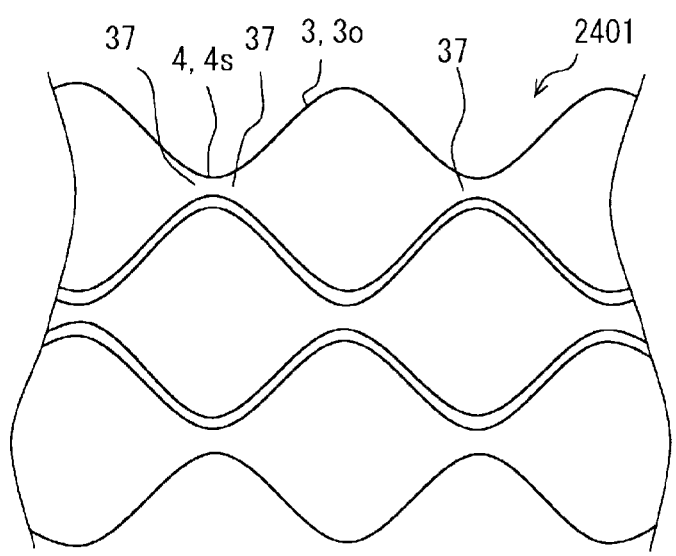
FIG. 55 is a partial enlarged plan view of a radiation heater apparatus according to a 24th embodiment of the present disclosure.

This embodiment is one of modifications based on a basic form provided by the preceding embodiment. FIG. 55 is a partial enlarged plan view of a radiation heater apparatus 2401. The radiation heater apparatus 2401 is a modification in which a part of the radiation heater apparatus 2301 is modified.

The heat radiation parts 3o and the heating parts 4s are formed of continuous smooth curves. The heat radiation parts 3o are portions of quadrilateral shapes having curved corners. The heating parts 4s are narrowed portions with narrow widths. The heating parts 4s and the heat radiation parts 3o are provided by the same material. The heating part 4s generates heat due to a narrow width of itself. In this configuration, it is impossible to clearly recognize a connecting part 37 between the heat radiation part 3o and the heating part 4s. In this embodiment, since the heating part 4s mainly generates heat, the connecting part 37 can be recognized based on a temperature distribution. According to this structure, the heat radiation parts 3o and the heating parts 4s can be arranged with a high density.

Twenty-Fifth Embodiment

Figure 56:
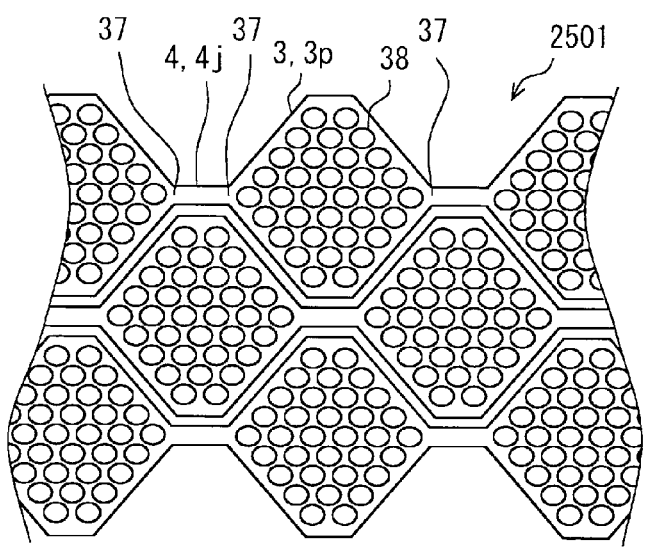
FIG. 56 is a partial enlarged plan view of a radiation heater apparatus according to a 25th embodiment of the present disclosure.

This embodiment is one of modifications based on a basic form provided by the preceding embodiment. FIG. 56 is a plan view showing a part of a radiation heater apparatus 2501 in an enlarged manner. The radiation heater apparatus 2501 is a modification in which a part of the radiation heater apparatus 2301 is modified.

The heat radiation parts 3p function also as the heating parts. The heat radiation parts 3p have high electric resistance for generating heat. The heat radiation part 3p has a plurality of independent holes 38. The plurality of holes 38 makes the heat radiation parts 3p in a mesh shape. According to this configuration, it is possible to generate heat also at the heat radiation parts 3p.

Twenty-Sixth Embodiment

Figure 57:
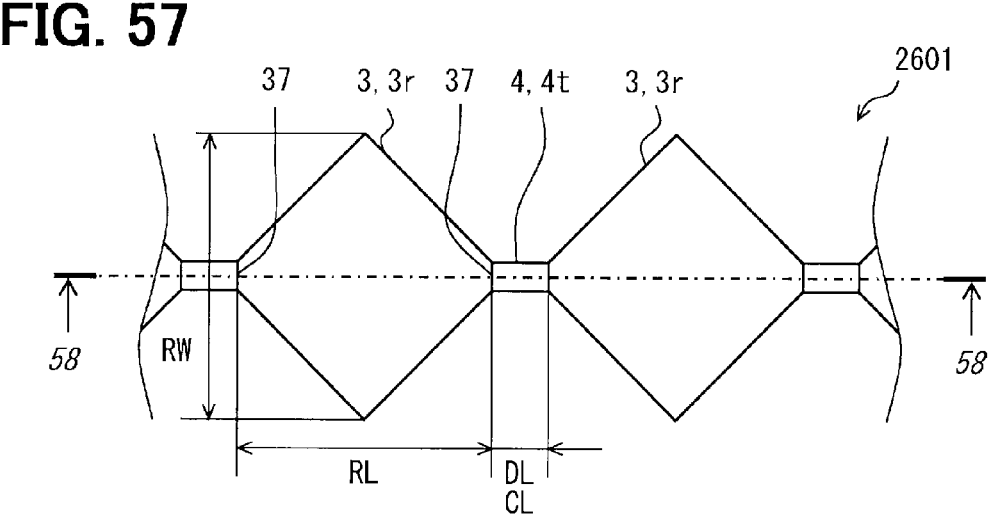
FIG. 57 is a partial enlarged plan view of a radiation heater apparatus according to a 26th embodiment of the present disclosure.
Figure 58:
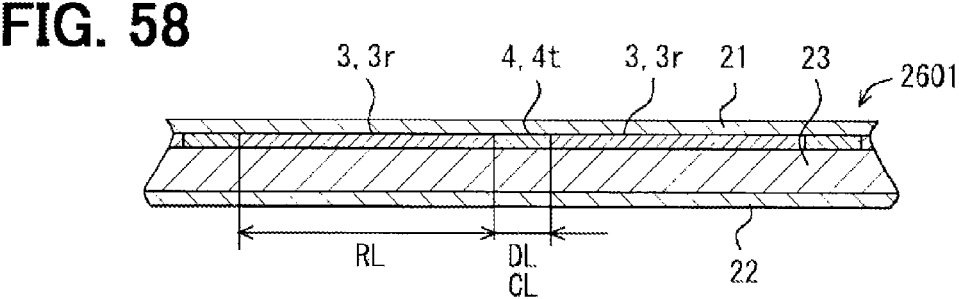
FIG. 58 is a partial enlarged cross sectional view of the radiation heater apparatus according to the 26th embodiment.

This embodiment is one of modifications based on a basic form provided by the preceding embodiment. FIGS. 57 and 58 show a part of a radiation heater apparatus 2601 in an enlarged manner. FIG. 58 shows a cross-section on a 58-58 line shown in FIG. 57. The radiation heater apparatus 2601 is a modification in which a part of the radiation heater apparatus 2401 is modified.

In this embodiment, the heat radiation parts 3r and the heating parts 4t are provided by different material. The heat radiation parts 3r are made of metal material excellent in thermal conductivity. The heating parts 4t are made of metal material which generate heat by being supplied with electric current.

Whole part of the heating part 4t is arranged within the thin layer which is defined by the thickness of the plurality of heat radiation parts 3r. The heating parts 4t are placed the same plan where the plurality of heat radiation parts 3r are arranged. The plurality of heat radiation parts 3r and the plurality of heating parts 4t overlap with respect to a surface direction of the heat radiation parts 3r, i.e., a direction parallel to the X-Y plan. In other words, whole part of the heating part 4t is placed within a thickness range of the heat radiation parts 3r. The heating parts 4t are not projected from the thin layer which is defined by the thickness of the plurality of heat radiation parts 3r.

According to this structure, the material of the heat radiation parts 3r can be selected for the purpose of heat transfer at the heat radiation parts 3r, and emission of the heat radiation. The material of the heating parts 4t may be selected for the purpose of heat generation at the heating parts 4t. As a result, it is possible to provide excellent heat radiation at the heat radiation parts 3r, and excellent heat generation at the heating parts 4t.

Twenty-Seventh Embodiment

Figure 59:
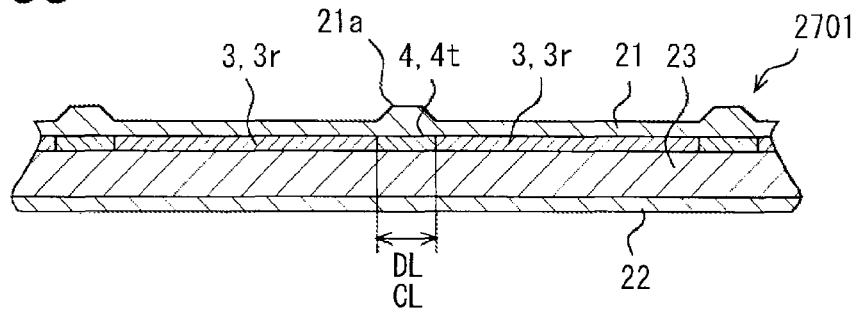
FIG. 59 is a partial enlarged cross sectional view of a radiation heater apparatus according to a 27th embodiment of the present disclosure.

This embodiment is one of modifications based on a basic form provided by the preceding embodiment. FIG. 59 is a partial enlarged plan view of the radiation heater apparatus 2701. The radiation heater apparatus 2701 is a modification in which a part of the radiation heater apparatus 2601 is modified.

The surface layer 21 has a projection part 21*a* at a position between adjacent heat radiation parts 3*r*, and corresponding to right above the heating parts 4*t*. The projection part 21*a* reduces heat transfer in a thickness direction of the substrate 2 at right above the heating part 4*t*. The projection part 21*a* reduces heat transfer along a straight path from the heating part 4*t* to the surface, without impeding the heat radiation from the heat radiation part 3*r*.

The projection part 21*a* may be formed as a plurality of independent projections, or a projected bead part extending along a line which pass through right above the plurality of heating parts 4*t*. When a body comes in contact with the surface of the radiation heater apparatus 2701, the projection part 21*a* reduces heat transfer to the body from the heating parts 4*t*.

Twenty-Eighth Embodiment

Figure 60:
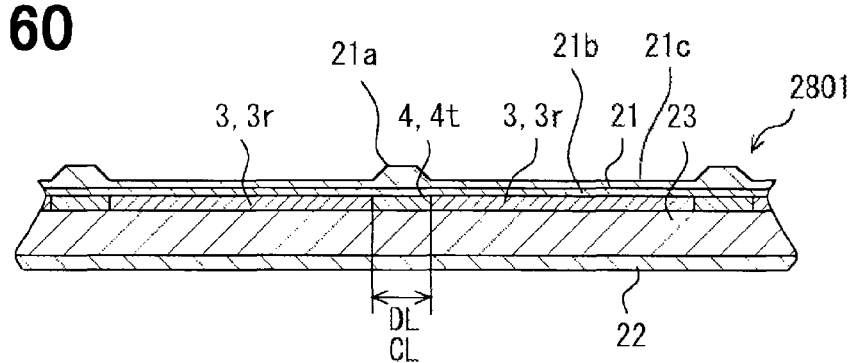
FIG. 60 is a partial enlarged cross sectional view of a radiation heater apparatus according to a 28th embodiment of the present disclosure.

This embodiment is one of modifications based on a basic form provided by the preceding embodiment. FIG. 60 is a partial enlarged plan view of the radiation heater apparatus 2801. The radiation heater apparatus 2801 is a modification in which a part of the radiation heater apparatus 2701 is modified. The surface layer 21 has an inner layer 21*b* which may be called as a flat plate shape or a film shape, and an outer layer 21*c* on which the projection part 21*a* is formed.

Figure 61:
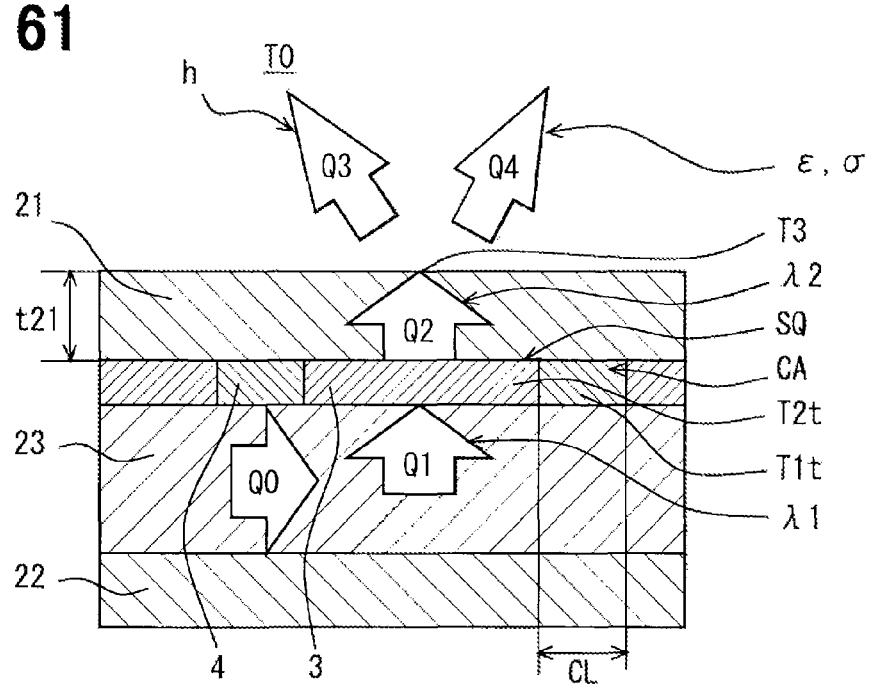
FIG. 61 is a partial cross sectional view showing a thermal conduction model of a radiation heater apparatus.
Figure 62:
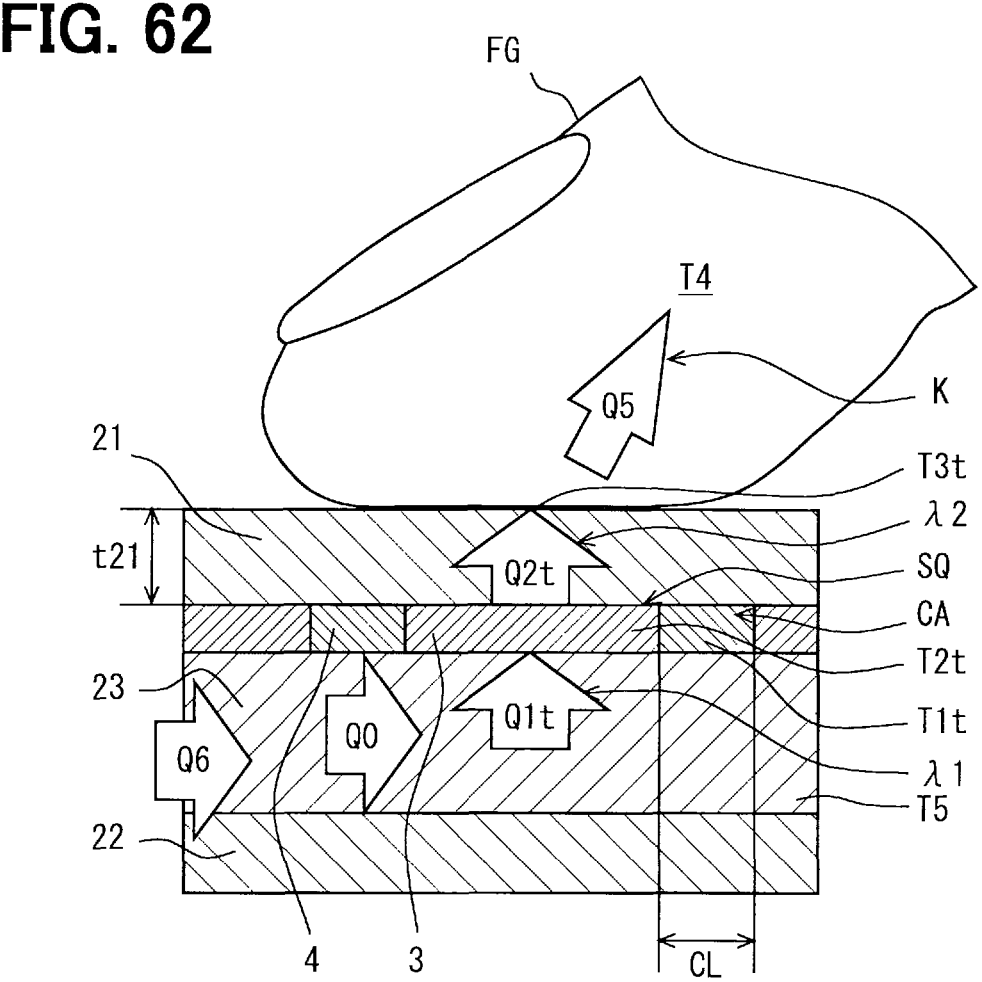
FIG. 62 is a partial cross sectional view showing a thermal conduction model of the radiation heater apparatus.

FIG. 61 shows a thermal conduction model in a condition where a body does not contact on the radiation heater apparatus. FIG. 62 shows the thermal conduction model in a condition where a second human finger contacts the radiation heater apparatus. In this thermal conduction model, a heat flow which goes to the surface (top face) of the radiation heater apparatus among the thermal energy which the heating parts 4 can generate is modeled. These models can also be expressed by using the above-mentioned expressions (1) through (8).

OTHER EMBODIMENTS

The preferred embodiments of the present disclosure have been described. However, the present disclosure is not limited to the above embodiments, and the above embodiments may be modified in various ways without departing from the spirit and scope of the invention. The configuration of the above described embodiments is just examples. The invention in its broader terms is therefore not limited to the specific details, representative apparatus, and illustrative examples shown and described. Some extent of the disclosure may be shown by the scope of claim, and also includes the changes, which is equal to and within the same range of the scope of claim.

For example, the shape of the heat radiation parts 3 is not restricted to the illustrated shapes. Various shapes, such as a circular shape, an ellipse shape, a hexagon shape, an octagon shape, a petal shape, and a spiral shape, may be used as the heat radiation parts 3. The plurality of heat radiation parts 3 may be arranged in accordance with various arrangement regulations, such as a concentric circle shape, a swirl shape, and a honeycomb shape.

The heat radiation parts 3*g* arranged in the meandering line shape in the 13th and 14th embodiments may be used in the other embodiments. For example, the heat radiation parts (heating parts) arranged in the meandering line shape may be used in the embodiments in which the heat radiation parts 3 and the heating parts 4 are provided by a common member.

Moreover, the heat radiation parts 3 may be exposed without forming the surface layer 21. A protective member formed in a net like shape or a transparent member may be disposed on an outside of the radiation heater apparatus additionally.

What is claimed is:

1. A radiation heater apparatus comprising:
    a plurality of heat radiation parts, each heat radiation part is capable of emitting heat radiation by thermal energy generated by being supplied with electric current, the plurality of heat radiation parts are arranged on a surface in a distributed manner, and are made by a material having high thermal conductivity; and
    a low thermal conductive part which has a thermal conductivity lower than a thermal conductivity in a cross section containing the plurality of heat radiation parts, and is disposed to surround each of the plurality of heat radiation parts, and reduces an inflow of the thermal energy from a periphery to each of the plurality of heat radiation parts.

2. The radiation heater apparatus claimed in claim 1, wherein
    each of the heat radiation parts is formed in a shape of a thin plate.

3. The radiation heater apparatus claimed in claim 1, further comprising:
    heating parts which are thermally connected to the plurality of heat radiation parts, and generate heat by being supplied with electric current.

4. The radiation heater apparatus claimed in claim 1, wherein
    the plurality of heat radiation parts are also heating parts which generate heat by being supplied with electric current.

5. The radiation heater apparatus claimed in claim 3, further comprising:
    a junction part made of an alloy and formed in a truncated cone shape which is arranged between each of the plurality of heat radiation parts and the heating parts, and is thermally and electrically connected to both the heat radiation part and the heating part.

6. The radiation heater apparatus claimed in claim 1, further comprising:

a heating part which is thermally connected to each of the plurality of heat radiation parts, and generates heat by being supplied with electric current, wherein the heating part and the plurality of heat radiation parts are arranged in an overlapping manner with respect to a direction vertical to a surface from which the heat radiation is emitted.

7. The radiation heater apparatus claimed in claim 1, further comprising:
a heating part which is thermally connected to each of the plurality of heat radiation parts, and generate heat by being supplied with electric current, the heating part being arranged to be covered with the plurality of heat radiation parts except for a part placed between adjacent heat radiation parts.

8. The radiation heater apparatus claimed in claim 6, wherein
the heating part is a thin metal line and is arranged without being directly connected with the plurality of heat radiation parts.

9. The radiation heater apparatus claimed in claim 8, wherein
the cross-sectional area of the metal line is not greater than 0.015 Square millimeters.

10. A radiation heater apparatus comprising:
a plurality of heat radiation parts, each radiation part is capable of emitting heat radiation by thermal energy generated by being supplied with electric current, the plurality of heat radiation parts are arranged on a surface in a distributed manner; and
a low thermal conductive part which has a thermal conductivity lower than a thermal conductivity in a cross section containing the plurality of heat radiation parts, and is disposed to surround each of the plurality of heat radiation parts, wherein
each of the heat radiation parts is formed in a shape of a thin plate,
the radiation heater apparatus further comprising:
a substrate part supporting the plurality of heat radiation parts; and
a conductor part through which the electric current can flow and which is disposed between adjacent two of the plurality of heat radiation parts, wherein
the low thermal conductive part contains the substrate part and the conductor part, without containing the plurality of heat radiation parts.

11. The radiation heater apparatus claimed in claim 10, wherein
a thermal conductivity in a cross section containing the plurality of heat radiation parts is an average thermal conductivity in a cross section crossing the plurality of heat radiation parts, and wherein
the thermal conductivity of the low thermal conductive part is an average thermal conductivity in a periphery surrounding the plurality of heat radiation parts.

12. The radiation heater apparatus claimed in claim 10, wherein
the thermal energy supplied to the plurality of heat radiation parts is set so that the temperature of the plurality of heat radiation parts can reach a radiation temperature for emitting the heat radiation which warms a human, and wherein
the thermal conductivity of the low thermal conductive part is set, when a body contacts above the heat radiation part, so that a temperature of a portion, where the body contacts, is stable at a suppressed temperature lower than the radiation temperature and higher than a temperature of the body.

13. The radiation heater apparatus claimed in claim 10, wherein
a length, along a flowing direction of electric current, of the conductor part is longer than a distance between adjacent heat radiation parts which are connected by the conductor part.

14. A radiation heater apparatus comprising:
a plurality of heat radiation parts, each radiation part is capable of emitting heat radiation by thermal energy generated by being supplied with electric current, the plurality of heat radiation parts are arranged on a surface in a distributed manner;
a low thermal conductive part which has a thermal conductivity lower than a thermal conductivity in a cross section containing the plurality of heat radiation parts and is disposed to surround each of the plurality of heat radiation parts; and
a heating part which is thermally connected to each of the plurality of heat radiation parts and generates heat by being supplied with electric current, wherein
at least a part of the heating part is arranged within a thin layer which is defined by a thickness of the plurality of heat radiation parts.

15. The radiation heater apparatus claimed in claim 14, wherein
each of the plurality of heat radiation parts are formed in a shape of thin plates.

16. The radiation heater apparatus claimed in claim 15, further comprising:
a substrate part which supports the plurality of heat radiation parts, wherein
the heating part is disposed between adjacent two of the heat radiation parts, and is a conductor part through which electric current can flow, and wherein
the low thermal conductive part contains the substrate part and the conductor part, without containing the plurality of heat radiation parts.

17. The radiation heater apparatus claimed in claim 16, wherein
the thermal conductivity in a cross section containing the plurality of heat radiation parts is an average thermal conductivity in a cross section which crosses the plurality of heat radiation parts, and wherein
the thermal conductivity of the low thermal conductive part is an average thermal conductivity in a periphery surrounding the plurality of heat radiation parts.

18. The radiation heater apparatus claimed in claim 14, wherein
the plurality of heat radiation parts are also the heating part which generates heat by being supplied with electric current.

19. The radiation heater apparatus claimed in claim 14, wherein
the plurality of heat radiation parts and the heating part are provided by the same continuous material.

20. The radiation heater apparatus claimed in claim 14, wherein
the plurality of heat radiation parts and the heating part are provided by different materials.

21. The radiation heater apparatus claimed in claim 1, wherein
a heat capacity of each of the plurality of heat radiation parts is set so that a temperature of a portion where the body contacts falls in a short period of time after the body contacts above the plurality of heat radiation parts.

22. The radiation heater apparatus claimed in claim 21, wherein the heat capacity of each of the plurality of heat radiation parts is set so that a temperature of the portion where the body contacts falls lower than 60 degrees Celsius within 0.32 seconds after the body contacts above the plurality of heat radiation parts.

* * * * *